United States Patent
Ben-Shalom et al.

(10) Patent No.: US 10,469,524 B2
(45) Date of Patent: Nov. 5, 2019

(54) TECHNIQUES FOR INTEGRATED ENDPOINT AND NETWORK DETECTION AND ERADICATION OF ATTACKS

(71) Applicant: INTEL CORPORATION, Santa Clara, CA (US)

(72) Inventors: Omer Ben-Shalom, Rishon le-Tzion (IL); Igor Muttik, Hertfordshire (GB); Alex Nayshtut, Gan Yavne (IL); Yaniv Avidan, Moshav Mahseya (IL)

(73) Assignee: INTEL CORPORATION, Santa Clara, CA (US)

( * ) Notice: Subject to any disclaimer, the term of this patent is extended or adjusted under 35 U.S.C. 154(b) by 149 days.

(21) Appl. No.: 14/369,587

(22) PCT Filed: Dec. 18, 2013

(86) PCT No.: PCT/US2013/076107
§ 371 (c)(1),
(2) Date: Aug. 17, 2015

(87) PCT Pub. No.: WO2015/094223
PCT Pub. Date: Jun. 25, 2015

(65) Prior Publication Data
US 2015/0365427 A1 Dec. 17, 2015

(51) Int. Cl.
*H04L 29/06* (2006.01)
*G06F 21/56* (2013.01)
*G06F 21/55* (2013.01)

(52) U.S. Cl.
CPC ............ *H04L 63/145* (2013.01); *G06F 21/55* (2013.01); *G06F 21/56* (2013.01); *G06F 21/567* (2013.01);
(Continued)

(58) Field of Classification Search
CPC .... G06F 21/56; H04L 63/105; H04L 63/1408
See application file for complete search history.

(56) References Cited

U.S. PATENT DOCUMENTS 8,205,257 B1  6/2012 Satish et al.
9,223,962 B1 * 12/2015 Kashyap ............... G06F 21/566
(Continued)

OTHER PUBLICATIONS

International Search Report and Written Opinion received for PCT Patent Application No. UPCT/US2013/076107, dated Sep. 18, 2014, 13 pages.
(Continued)

*Primary Examiner* — Jason K Gee

(57) ABSTRACT

Various embodiments are generally directed to techniques to detect and eradicate malware attacks by employing information indicative of malware activity received from both endpoint devices and network devices proving network services to endpoint devices. An apparatus to detect malware includes a processor component, an analysis component for execution by the processor component to employ a trust level assigned to a device in a network as a factor in an analysis of an indication received from the device of a malware attack, and an eradication component for execution by the processor component to determine an action to take through the network to eradicate the malware attack based on the analysis. Other embodiments are described and claimed.

17 Claims, 10 Drawing Sheets

(52) U.S. Cl.
CPC ........ *H04L 63/107* (2013.01); *H04L 63/1416* (2013.01); *H04L 63/1441* (2013.01)

(56) References Cited

U.S. PATENT DOCUMENTS

| | | | |
|---|---|---|---|
| 2003/0166397 A1* | 9/2003 | Aura | H04L 63/0823 455/410 |
| 2004/0143759 A1* | 7/2004 | Mendonca | H04L 63/1416 726/23 |
| 2005/0188214 A1* | 8/2005 | Worley | G06F 21/52 713/187 |
| 2006/0129810 A1 | 6/2006 | Jeong et al. | |
| 2006/0190606 A1 | 8/2006 | Kohavi | |
| 2006/0259967 A1* | 11/2006 | Thomas | H04L 63/145 726/22 |
| 2008/0195728 A1* | 8/2008 | Betarbet | H04L 29/06 709/224 |
| 2011/0191847 A1 | 8/2011 | Davis et al. | |
| 2013/0042298 A1* | 2/2013 | Plaza Fonseca | G06F 21/335 726/1 |
| 2013/0086690 A1 | 4/2013 | Nachenberg et al. | |

OTHER PUBLICATIONS

Extended European Search Report received for European Patent Application No. 13899624.4, dated Mar. 29, 2017, 6 pages.

* cited by examiner

TECHNIQUES FOR INTEGRATED ENDPOINT AND NETWORK DETECTION AND ERADICATION OF ATTACKS

TECHNICAL FIELD

Embodiments described herein generally relate to detecting and eradicating malware attacks against both endpoint devices and network devices providing network services to the endpoint devices.

BACKGROUND

Detection and eradication of malware-based attacks has long been an issue for computing devices both within the infrastructure of a network and at its endpoints. Network devices making up core portions of networks have become increasingly sophisticated in monitoring and analyzing activity occurring throughout a network to determine whether an attack to compromise the security of the network is underway and respond to block it. Correspondingly, it has become commonplace to employ anti-malware routines (e.g., anti-virus software) to monitor and analyze activity within a computing device disposed at an endpoint of a network to determine whether an attack to compromise the security of the computing device, and then the network, is underway and respond to block it.

However, such efforts to address attacks to networks and attacks to computing devices disposed at endpoints of networks are typically not coordinated. Network devices making up core portions of a network typically exchange information concerning detected activities that may be indicative of an attack to the network, but seldom exchange such information with the computing devices at the endpoints. This partly arises due to the network devices often remaining under the direct control of personnel who maintain the network while the computing devices at the endpoints are usually under the direct control of other persons who use the computing devices and the services of the network, but are not involved in maintaining either. Thus, the computing devices at the endpoints of the network are treated by those who maintain the network as presumably already compromised such that any information that might be provided by those computing devices to indicate aspects of an attack is treated as unreliable. Indeed, it is common practice for personnel who maintain the network to not bother to obtain such information from endpoint devices, and to ignore any such information that may be received from endpoint devices.

DETAILED DESCRIPTION

Figure 1:
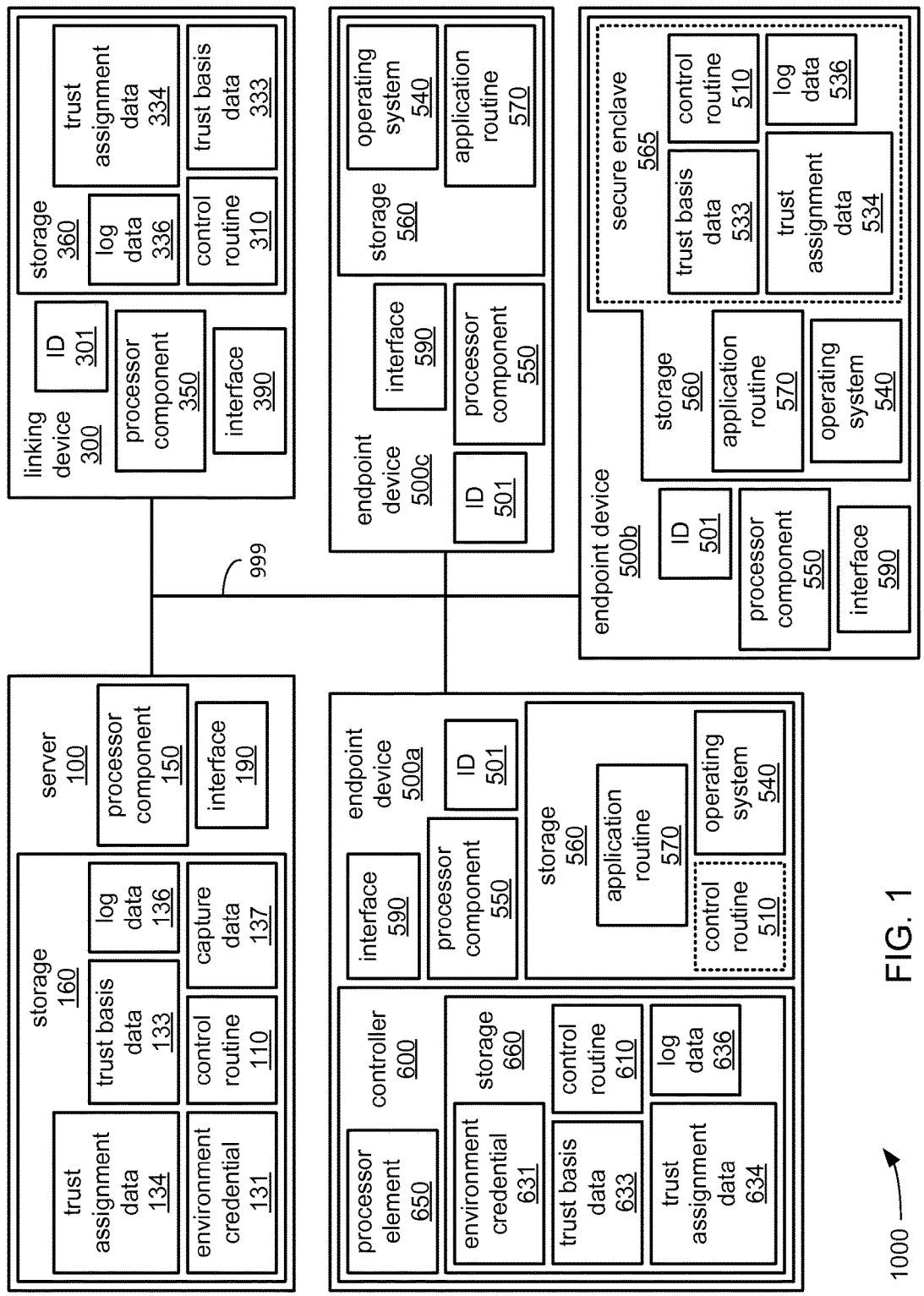
FIG. 1 illustrates an embodiment of a malware detection system.

Various embodiments are generally directed at techniques to detect and eradicate malware attacks by utilizing information indicative of malware activity received from both endpoint devices and network devices providing network services to endpoint devices. More specifically, trust levels are assigned to at least a portion of each endpoint device and network device associated with a network, and those trust levels are associated with information received from each endpoint device and network device that may provide an indication of malware activity.

A server acting as a network device associated with a network assigns trust levels to one or more endpoint devices and/or one or more other network devices of the network. The server may determine trust levels to assign based on the locations of endpoint devices and/or of other network devices within the network. By way of example, a trust level may be determined based on whether an endpoint device is coupled to a secure portion of the network, a portion of the network that incorporates an insecure public network (e.g., the Internet, an unsecured wireless network, etc.), or a secure remote portion of the network that must be accessed through an insecure public network. Alternatively or additionally, the server may determine trust levels to assign based on security measures provided to secure an endpoint device or another network device. By way of example, a trust level may be determined based on measures to physically secure an endpoint or other network device from being physically reached by unauthorized persons who may try to operate the endpoint device, or measures to verify an authorized operator of the endpoint device.

Alternatively or additionally, a component of an endpoint device operating in a secure operating environment may determine trust levels to assign to one or more operating environments provided by the endpoint device depending on the measures employed within the endpoint device to secure those operating environments or the components that provide them. Such trust levels for different components or operating environments of an endpoint device may augment or at least partially supercede a trust level assigned to the endpoint device by the server. By way of example, a processor component of a secured controller of an endpoint device may determine differing trust levels for different routines executed within the endpoint device based on whether each is executed within a secure operating environment or is otherwise secured from attack by malware that may also be present within the endpoint device. One of the differing trust levels may be the same trust level assigned to the endpoint device as a result of its location in the network and/or its physical location.

Alternatively or additionally, a trust level of an endpoint device or a component of an endpoint device may be determined based on verification of credentials attesting to an ability to provide a secure operating environment for the execution of one or more routines within the endpoint device. Such verification of credentials may be based on any of a variety of verification mechanisms, including digital signatures, public-private key sets, certificate issued by a certification authority, a hash of a portion of a routine, etc. Such credentials may include a hash or other output of a measurement of trustworthiness taken of an operating environment, such as a mathematical or other analysis of that operating environment, to provide an attestation to the degree of protection for secure execution of a routine that it is able to provide.

During normal operation of the network and each of the endpoint devices, one or more of the network devices and/or the endpoint devices may transmit an indication to the server of activity that may be associated with a malware attack. The indication may be of particular activity of an endpoint device on the network that is observed by a network device. Alternatively or additionally, the indication may be of particular activity by a routine executed within the endpoint device observed by another component of the endpoint device operating within a secure operating environment. Alternatively or additionally, the indication may be of corruption of a routine executed within the endpoint device.

In response, the server may request additional information from one or more of the network devices and/or the endpoint devices, such as a log of activity within one or more of these devices or a capture of a snapshot of the contents of a portion of a storage of one or more of these devices. Each of these additional pieces of information is associated with an earlier assigned trust level, and those trust levels are factored into the analysis of the information by the server. In some embodiments, the various trust levels may be used to resolve apparent contradictions between pieces of information. In other embodiments, the various trust levels may be used as weighting factors such that multiple pieces of information with lower trust levels, but which are consistent with each other, may be deemed to be more trustworthy than a single piece of information with a higher trust level that contradicts the multiple pieces of information.

Alternatively or additionally, in embodiments in which an endpoint device determined to be subject to a malware attack is able to be remotely controlled by the server, the server may signal that endpoint device to reset itself as an approach to eradicating malware determined to be associated with the malware attack. In such embodiments, the endpoint device may include a controller incorporating a controller processor component that is able to trigger a reset of a main processor component to cause reinitialization of an operating system executed by the main processor component.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a malware detection system 1000 incorporating one or more of a server 100, a linking device 300, and endpoint devices 500a, 500b and/or 500c. Each of these computing devices 100, 300 and 500a-c may be any of a variety of types of computing device, including without limitation, a desktop computer system, a data entry terminal, a laptop computer, a netbook computer, a tablet computer, a handheld personal data assistant, a digital camera, a smartphone, a smart wristwatch, smart glasses, a body-worn computing device incorporated into clothing, a computing device integrated into a vehicle (e.g., a car, a bicycle, a wheelchair, etc.), a server, a cluster of servers, a server farm, etc.

As depicted, one or more of these computing devices 100, 300 and 500a-c exchange signals associated with indications of what may be malware attacks. However, one or more of these computing devices may exchange other data entirely unrelated to detection or eradication of malware attacks with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

The linking device 300 may be any of a variety of types of computing device that couples portions of the network 999 and/or devices coupled to those portions together to at least partly form the network 999. By way of example, the linking device 300 may be a router, network switch, firewall appliance, wireless access point, network proxy, network cache, etc. The server 100 may be any of a variety of types of computing device that provides services to other devices on the network 999 such that the server 100 may be a distinct standalone computing device providing such services or may be a subpart of another linking device. Alternatively or additionally, the server 100 may be made up of more than one computing device coupled to each other (either through the network 999 or in another manner) to cooperate to provide such services. The server 100 analyzes indications of activity occurring on the network 999 and/or occurring within one or more of the devices coupled to the network 999 to detect a malware attack and/or to determine a response to a malware attack. The endpoint devices 500a-c may be client devices and/or other servers coupled to the network and monitored by the server 100.

In the malware detection system 1000, embodiments of the computing devices 100, 300 and/or 500a-c may cooperate to form at least a portion of a type of security information and event management (SIEM) system in which indications of possible malware attacks are exchanged, analyzed and/or acted upon to address possible malware attacks against one or more of these computing devices. In preparation for detecting and/or eradicating malware attacks, the server 100 determines and assigns trust levels to at least a subset of at least the computing devices 300 and 500a-c. During normal operation of these computing devices 100, 300 and 500a-c, and of the network 999, the server 100 awaits receipt of an indication of a possible malware attack from one or more of the computing devices 300 and 500a-c. In response, the server 100 may request further information from one or more of the computing devices 300 and 500a-c, and/or may signal one or more of the computing devices 300 and 500a-c to take a specified action to attempt to eradicate the malware that may be associated with the malware attack.

It should be noted, however, that despite the depiction in FIG. 1 of such an allocation of roles among the computing devices 100, 300 and 500a-c, the roles of more than one of these computing devices may be assumed within a single one of these computing devices. By way of example, a secure operating environment within one of the endpoint devices 500a or 500b may perform the work analyzing indications of possible malware attacks and may determine a response, including making requests for further information. Stated differently, a peer-to-peer arrangement among the endpoint devices 500a-c may be formed in which one performs such analysis and determination of a course of action to take for indications of malware attacks received from the others. Further, which one(s) of the endpoint devices 500a-c performs such analysis and determination functions may be dynamically determined and assigned.

It should be noted that, despite the depiction in FIG. 1 of particular quantities of particular types of computing devices, embodiments are possible in which there are differing quantities of each the computing devices 100, 300 and 500a-c. By way of example, the server 100 may more directly interact with the endpoint devices 500a-c without the use of the linking device 300 such that the linking device 300 may not be present, or may interact with one or more of the endpoint devices 500a-c through multiple ones of the linking device 300. Also by way of example, there may be none of the endpoint devices 500a, 500b or 500c present, and/or there may be more of the endpoint devices 500a, 500b and/or 500c than are depicted. Stated differently, what is depicted in FIG. 1 is a simplified example to facilitate understanding, and should not be taken as limiting.

In various embodiments, the server 100 incorporates one or more of a processor component 150, a storage 160 and an interface 190 to couple the server 100 to the network 999. The storage 160 stores one or more of a control routine 110, an environment credential 131, trust basis data 133, trust assignment data 134, log data 136 and capture data 137. In various embodiments, the linking device 300 incorporates one or more of a processor component 350, a storage 360 and an interface 390 to couple the linking device 300 to the network 999. The storage 360 stores one or more of a control routine 310, trust basis data 333, trust assignment data 334 and log data 336. The linking device 300 also incorporates an identifier (ID) 301 that is uniquely associated with the linking device 300, and which in various embodiments may be stored in the storage 360 or elsewhere within another component of the linking device 300 (e.g., permanently stored within the processor component 360 or the interface 390). The control routines 110 and 310 each incorporate a sequence of instructions operative on corresponding ones of the processor components 150 and 350 in their roles as main processor components of their respective ones of the computing devices 100 and 300 to implement logic to perform various functions.

In executing the control routine 110, the processor component 150 of the server 100 determines and assigns trust levels for at least a portion of each of one or more of the computing devices 300 and 500a-c. The assigned trust levels are stored as the trust assignment data 134. In some embodiments, the server 100 may be provided with the trust levels for one or more of the computing devices 300 and 500a-c. In such embodiments, personnel tasked with maintaining the network 999 may determine what one or more of those trust levels should be based on their knowledge of what security measures are employed to secure the network 999 and/or each of the computing devices 300 and 500a-c. Alternatively or additionally, personnel tasked with maintaining the network 999 may provide within the trust basis data 133 indications of what security measures are in place for various portions of the network 999 and/or for various physical locations at which one or more of the linking device 300 and the endpoint devices 500a-c may be disposed.

In other embodiments, the processor component 150 may employ one or more rules and/or other pieces of security information stored in the trust basis data 133 and germane to determining trust levels to automatically determine trust values for at least a portion of one or more of the computing devices 300 and 500a-c. Such determinations may be based, at least in part, on locations of computing devices within the network 999 and/or physical locations at which computing devices in the network 999 are disposed.

In some of such embodiments, the locations on which such determinations of trust levels may be based may include physical locations of one or more of the computing devices 300 and 500a-c, including and not limited to, what building and/or room a computing device is situated in, what person's desk the computing device is situated at, etc. The trust basis data 133 may include indications of degree of physical security provided by particular buildings, rooms and/or other locations (e.g., particular desks, kiosks, etc.). Such indications of degree of physical security may reflect such factors as physical access restrictions (e.g., locks on doors, numbers of persons permitted entry, etc.), timing access restrictions (e.g., limited hours of access), or prevalence of security monitoring (e.g., cameras, regular patrols, etc.).

Alternatively or additionally, in some embodiments, the locations on which such determinations of trust levels may be based may include locations of one or more of the computing devices on the network 999, including and not limited to, the relative level of security of different portions of the network 999. Such relative levels of security may be based on what communications media is employed for a portion (e.g., wired versus wireless), whether encryption or other measures to detect interference with communications are employed in a portion, or whether a portion includes or requires access through an openly accessible public network (e.g., the Internet). As familiar to those skilled in the art, a determination of a level of trust for communications with a computing device may include both the degree to which the computing device itself is secure and the degree to which communications with that computing device is secure.

In some embodiments, the processor component 150 of the server 100 may cooperate with the processor component 350 of the linking device 300 to determine trust levels to assign to one or more of at least the endpoint devices 500a-c. This may arise as a result of the linking device 300 having more direct access than the server 100 to indications of locations of one or more of the endpoint devices 500a-c. By way of example, where the linking device 300 is a network switch, router, or other type of network device that couples multiple portions of the network 999, the server 100 may be located on a different portion of the network 999 from one or more of the endpoint devices 500a-c such that the server 100 must rely on the linking device 300 to detect the locations of one or more of endpoint devices 500a-c.

Regardless of whether trust levels are assigned by personnel and/or determined automatically for each of the computing devices 300 and 500a-c, the server 100 may request and/or be automatically provided with identifiers from each of these computing devices (e.g., the ID 301 of the linking device 300) to match against entries in the trust basis data 133 for each. In embodiments in which such identifiers are so received, the server 100 may employ such identifiers to at least distinguish computing devices that are authorized to be part of the network 999 from those that are not. Alternatively or additionally, such identifiers for one or more of the computing devices 300 and 500a-c may be correlated in the trust basis data 133 to indications of specific predetermined trust levels.

Figure 2:
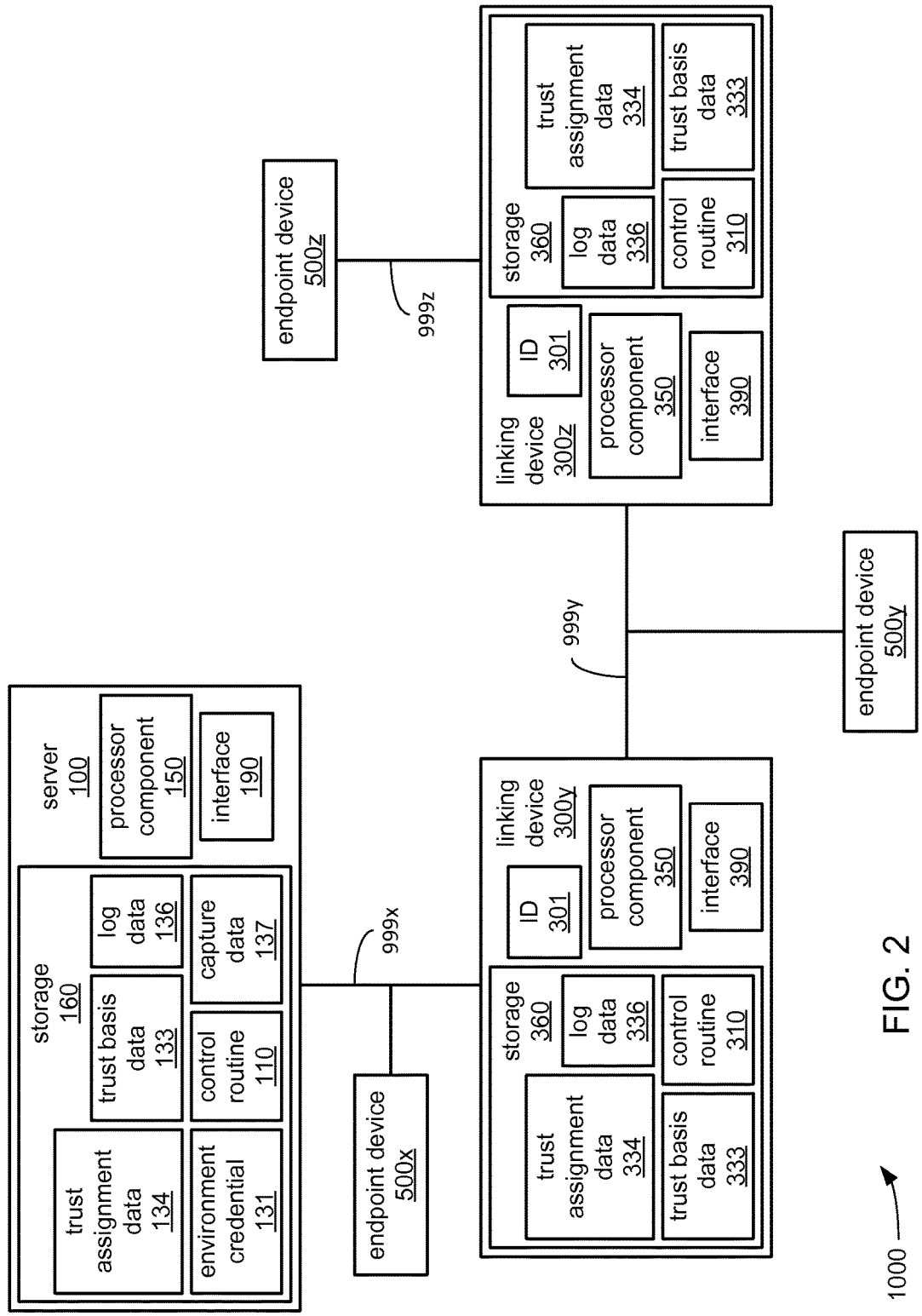
FIG. 2 illustrates an embodiment of assignment of trust levels.

FIG. 2 illustrates an example of an embodiment of such cooperation between the processor components 150 and 350 to determine trust levels for one or more endpoint devices. As depicted, the network 999 is divided into at least three portions 999x, 999y and 999z by linking devices 300y and 300z, each of which is an instance of the linking device 300 of FIG. 1. Located in the portions 999x, 999y and 999z are endpoint devices 500x, 500y and 500z, respectively. Each of the endpoint devices 500x, 500y and 500z may be an instance of any one of the endpoint devices 500a, 500b or 500c depicted in FIG. 1.

Depending on characteristics of the portion 999x (e.g., topology, protocols, media, etc.), the server 100 may be able to detect the presence of the endpoint device 500x in the portion 999x. Thus, the server 100 may be able to determine that the endpoint device 500x is located in the portion 999x without assistance from either of the linking devices 300y or 300z.

However, the endpoint device 500y is located in the portion 999y that is separated from the portion 999x by the linking device 300y. Also, the endpoint device 500z is located in the portion 999z that is further separated by the linking device 300z. Such separation of the network 999 into these three portions 999x-z may arise, for example, where the portions 999x and 999z are internal and physically secure networks belonging to a common organization (e.g., a corporation, a government agency, etc.) and maintained by personnel associated with that organization, but the portion 999y is not. The portion 999y may traverse and/or include an openly accessible public network such as the Internet, and the linking devices 300y and 300z may cooperate to form a secure pathway between them and through the portion 999y, such as a virtual private network (VPN). Thus, the server 100 may not be able to detect aspects of the portions 999y or 999z germane to determining trust levels, such as the portion 999z being a private and secure network that must be linked to the private and secure portion 999x through the public and less secure portion 999y via various techniques (e.g., VPN) to maintain security.

In some embodiments, the processor components 350 of each of the linking devices 300y and 300z, in executing their respective ones of the control routine 310, may detect the locations of the endpoint devices 500y and 500z in the portions 999y and 999z, respectively, and convey indications of those locations to the server 100. The trust basis data 333 of each of the linking devices 300y and 300z may include indications of the degree of security (or lack thereof) of each of the portions 999y and 999z, respectively, and each of the processor components 350 may transmit such indications to the server 100 to enable the processor component 150 to use those indications in determining trust levels of each of the endpoint devices 500y and 500z. Further, the trust basis data 333 may include an indication of whether encryption, VPN or other techniques are employed in communications between the endpoint device 500y and the linking device 300y to cause those communications to be secure despite extending through the less secure portion 999y. Alternatively or additionally, the trust basis data 333 may include an indication of the endpoint device 999z being located in a secure room of a secure building accessible only to the personnel who maintain the network 999 and/or an indication of the linking device 300z imposing a network access policy on the endpoint device 999z that does not allow it to be used to access websites outside the network 999. Such indications of the individual conditions under which each of the endpoint devices 500y and 500z are operated may also be transmitted to the server 100 for the processor component 150 to use in determining trust levels.

In other embodiments, the processor component 150 may signal the processor components 350 of each of the linking devices 300y and 300z that the determination of trust levels for endpoint devices in the portions 999y and 999z are delegated to them. In response, the processor components 350 of each of the linking devices 300y and 300z may employ their respective copies of the trust basis data 333 to determine trust levels for the endpoint devices on the portions 999y and 999z, including the endpoint devices 500y and 500z, respectively. The processor components 350 may store these determined trust levels as their respective ones of the trust assignment data 334, which each of the processor components 350 may then transmit to the server 100. Upon receiving the indications of trust levels assigned to at least the endpoint devices 500y and 500z in the copies of the trust assignment data 334 from the linking devices 300y and 300z, respectively, the processor component 150 may store those indications as part of the trust assignment data 134. Thus, the trust assignment data 134 may become a superset of indications of trust levels determined for endpoint devices throughout the network 999, whether those trust levels were determined by the processor component 150 or by processor components of one or more other network devices, such as the linking devices 300y and 300z.

Returning to FIG. 1, as depicted, each of the endpoint devices 500a-c incorporates different combinations of components affording each of the endpoint devices 500a-c different security capabilities, and accordingly, enabling the assignment of different trust levels to each. Thus, as will be explained in greater detail, the trust levels assigned to each of the endpoint devices 500a-c may differ, even if all three are disposed at the same location physically and/or within the same portion of the network 999.

In each of the endpoint devices 500a-c, a processor component 550 executes one or both of an operating system 540 and an application routine 570, each of which incorporates a sequence of instructions operative on the processor component 550 in its role as a main processor component of each of the endpoint devices 500a-c to implement logic to perform various functions. In each of the endpoint devices 500a-c, the application routine 570 may be any of a variety of types of application, including and not limited to, word processors, spreadsheet editors, CAD/CAM software, website browsers, audio/visual recording and/or playback software, photograph editors, etc. The operating system 540 may be any of a variety of types of operating system that cooperates with the processor component 550 of one or more of the endpoint devices 500a-c to provide an operating environment to support execution of the application routine 570.

As familiar to those skilled in the art, computing devices such as the endpoint devices 500a-c may become "infected" with malware that corrupts one or both of the application routine 570 and the operating system 540 to perform any of a variety of malicious tasks. Stated differently, one or more of the endpoint devices 500a-c may have malicious routines (e.g., so-called "viruses" or "worms") surreptitiously loaded into the storage 560 and executed by the processor component 550 to perform various malicious tasks. Such malicious tasks include and are not limited to stealing information, gaining control of a computing device to enable it to be commanded by remote control to transmit malware to other computing devices via a network and/or gaining control of services provided on a network. To combat such malware, a control routine 510 may be installed within one or more of the endpoint devices 500a-c to prevent the loading of malware and/or to monitor for and block such efforts by malware employing techniques familiar to those skilled in the art of so-called "anti-virus" software.

In various embodiments, the endpoint device 500a incorporates one or more of a processor component 550, a storage 560, a controller 600 and an interface 590 to couple the endpoint device 500a to the network 999. The storage 560 stores one or more of the control routine 510, the operating system 540 and the application routine 570. The controller 600 incorporates one or more of a processor component 650 and a storage 660. The storage 660 stores one or more of a control routine 610, an environment credential 631, trust basis data 633, trust assignment data 634 and log data 636. The controller 600 may provide an operating environment isolated from that of the main processor component 550 and the storage 560, with its own independent controller processor component 650 and storage 660. Thus, the controller 600 may provide a secure operating environment that enables execution of the control routine 610 in a secure manner that is significantly protected from interference by any malware that may be executed by the processor component 550.

In various embodiments, the endpoint device 500b incorporates one or more of a processor component 550, a storage 560 and an interface 590 to couple the endpoint device 500b to the network 999. The storage 560 stores one or more of the control routine 510, the operating system 540, the application routine 570, trust basis data 533, trust assignment data 534 and log data 536. The control routine 510 may cooperate with the processor component 550 to define a secure enclave 565 within the storage 560 in which at least the control routine 510 is stored for secure execution by the processor component 550 in a secure operating environment to which access from other routines is greatly restricted to prevent interference from malware. Also stored within the secure enclave 565 may be one or more of the trust basis data 533, the trust assignment data 534 and the log data 536. The formation of the secure enclave 565 may depend on features of the processor component 550 to enforce restrictions on access to the secure enclave 565 by routines executed from locations of the storage 560 that are outside of the secure enclave 565. An example of the provision of such a secure enclave are the Software Guard Extensions (SGX) Technology promulgated by Intel Corporation of Santa Clara, Calif., in various forms of processors that may be employed to implement the processor component 550. Alternatively or additionally, the control routine 510 may be stored in a non-volatile portion of the storage 560 that prevents corruption of the control routine 510 such that it is able to reliably cooperate with the processor component 550 to form the secure enclave 565 each time the endpoint device 500b is reinitialized (e.g., "rebooted").

In various embodiments, the endpoint device 500c incorporates one or more of a processor component 550, a storage 560 and an interface 590 to couple the endpoint device 500c to the network 999. The storage 560 stores one or more of the operating system 540 and the application routine 570. Unlike the endpoint devices 500a and 500b, no form of secure operating environment is provided within the endpoint device 500c. A form of the control routine 510 implementing logic to monitor for and block malware may also be stored within the storage 560 and executed by the processor component 550, but such a form of the control routine 510 is less protected in the endpoint device 500c from being corrupted, itself, than its counterparts in the endpoint devices 500a-b.

Figure 3:
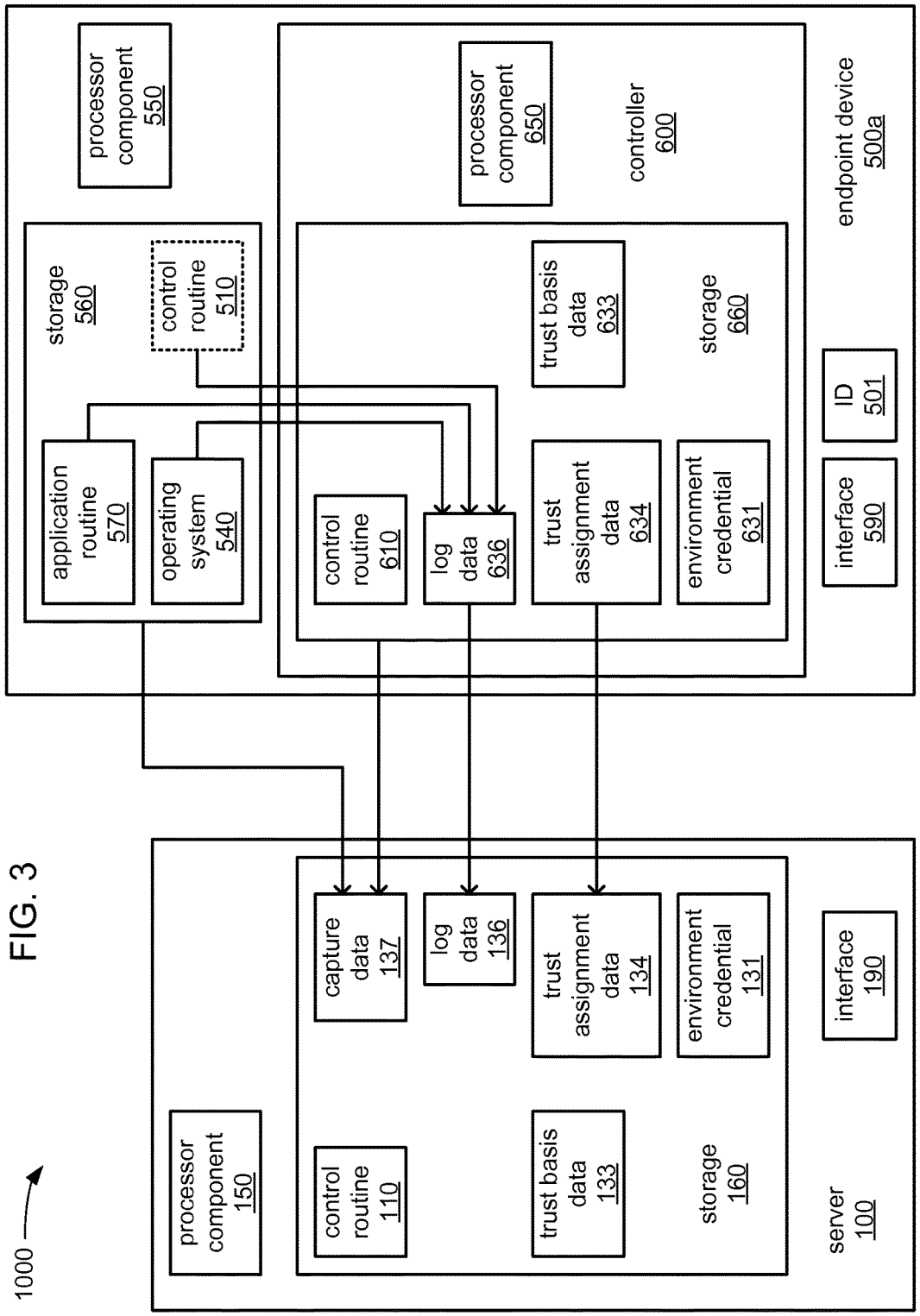
FIGS. 3-4 each illustrate an embodiment of an exchange of indications of an attack.
Figure 4:
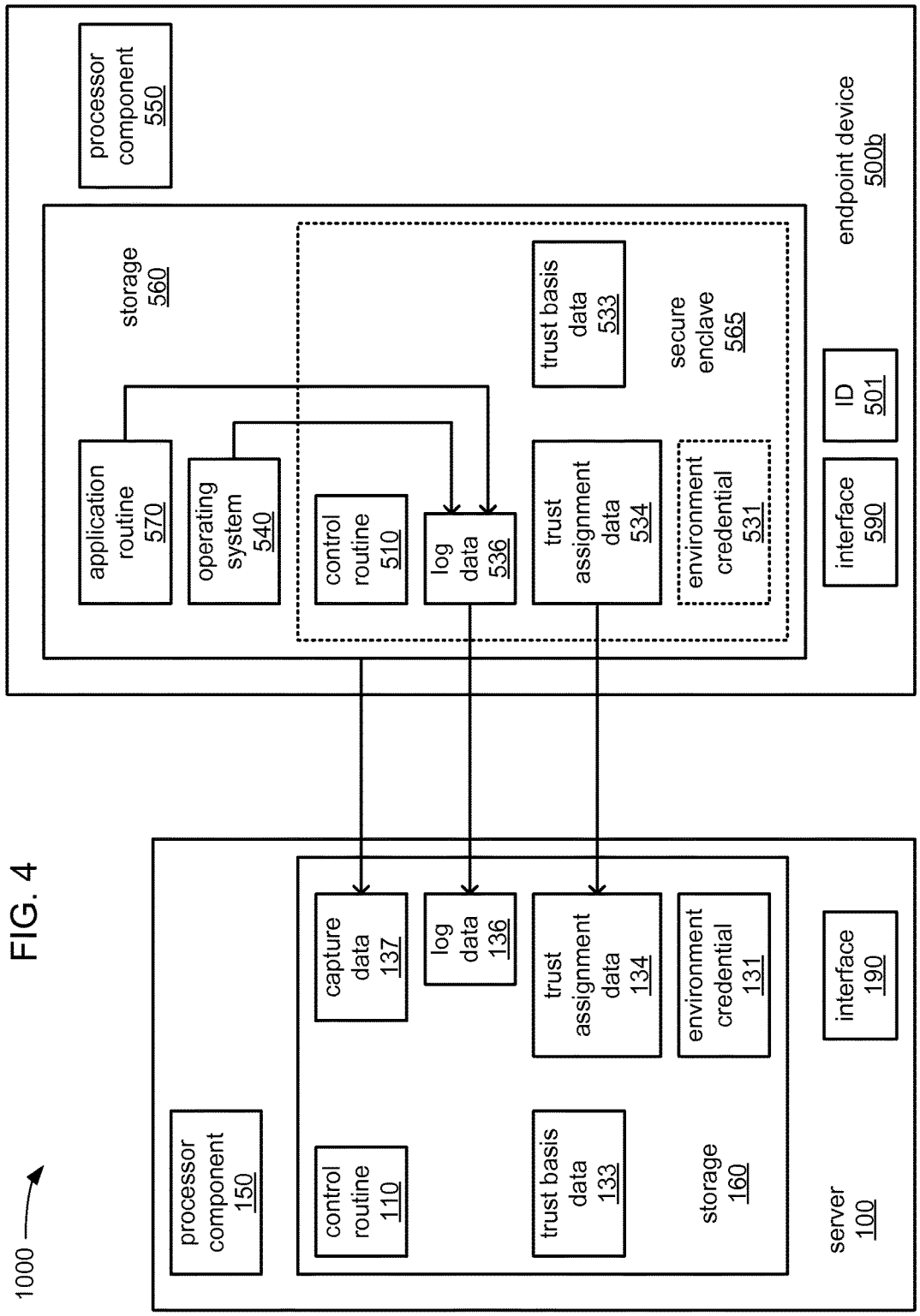

In some embodiments, one or more of the endpoint devices 500a-c may also incorporate a unique identifier (ID) 501, which in various embodiments may be stored in the storage 560 or elsewhere within another component (e.g., permanently stored within the processor component 560 or the interface 590). Referring to all three of the endpoint devices 500a-c, the control routines 510 and 610 each incorporate a sequence of instructions operative on corresponding ones of the processor component 550 in its role as main processor component and the processor component 650 in its role as controller processor component, respectively, to implement logic to perform various functions. Turning to the endpoint devices 500a and 500b, the fact of the provision of secure operating environments in which one or more routines may be executed in a manner secured from attack by malware results in there being at least two different operating environments that may each be assigned a different trust level. Stated differently, each of the endpoint devices 500a and 500b may be assigned more than one trust level in recognition that information received by the server 100 from the secure operating environment provided within one or the other of these endpoint devices may be deemed more trustworthy than information originating from the less secure operating environments of each. FIGS. 3 and 4 each illustrate an example of an embodiment of an assignment of multiple trust levels to each of the endpoint devices 500a and 500b.

Turning to FIG. 3, in executing the control routine 610, the processor component 650 may initially transmit an indication of the ID 501 to the server 100 to enable the processor component 150, in executing the control routine 110, to verify that the endpoint device 500a is authorized to be part of the network 999. In so doing, the processor component 150 may compare the ID 501 to entries indicative of devices authorized to be part of the network 999 within the trust basis data 133.

The processor component 650 may then employ the environment credential 631 in an exchange of at least one security credential with the server 100 that enables the processor component 150 to verify that the endpoint device 500a is capable of providing a secure operating environment. More specifically, such an exchange of one or more credentials may be employed to enable the processor component 150 to verify that the endpoint device 500a incorporates the controller 600 to provide a secure operating environment that is substantially isolated from the operating environment in which the operating system 540 and/or the application routine 570 are executed. Again, such verification of credentials may be based on any of a variety of verification mechanisms, including digital signatures, public-private key sets, certificate issued by a certification authority, a hash of a portion of a routine, etc. Regardless of the exact verification mechanism employed, the environment credential 631 may be incorporated into the controller 600 by the manufacturer of whatever circuit of the endpoint device 500a incorporates the controller 600, or may be so incorporated by the manufacturer of the endpoint device 500a. By way of example, the environment credential 631 may be incorporated into the processor component 650.

As a result of such verification, the processor component 150 of the server 100 may assign a trust level determined by the processor component 150 to be relatively high to the secure operating environment provided by the controller 600. Thus, information received from the controller 600 indicative of possible malware activity is ascribed a relatively high level of trust. In some embodiments, the processor component 150 of the server 100 may also assign a separate trust level determined by the processor component 150 to be a lesser level of trust to the operating environment in which the operating system 540 and/or the application routine 570 is executed. However, in other embodiments, the processor component 150 may signal the controller 600 to determine the trust level to be assigned to the environment in which the operating system 540 and/or the application 570 is executed. In such embodiments, the processor component 650 may employ indications of rules of trust and/or various parameters relevant to the trustworthiness of the operating environment in which the operating system 540 and/or the application routine 570 is executed to determine what trust value to assign to that operating environment. Once determined, that trust level may be stored within the trust assignment data 634, and may then be transmitted to the server 100, where the processor component 150 may add an indication of that trust level to the trust assignment data 134.

Further, in executing the control routine 610, the processor component 650 may cooperate with the processor component 550 to define a secure enclave within the storage 560 in which the operating system 540 and/or the control routine 510 (if present) may be stored and executed by the processor component 550. This may result in the assignment of a third trust level of an intermediate value between the relatively high trust level of the secure operating environment provided by the controller 600 and the relatively low trust level of the operating environment in which at least the application routine 570 may be executed. In embodiments of the endpoint device 500a that include the control routine 510 executed within such a secure enclave for the purpose of detecting and blocking malware attacks against at least the application routine 570, information received by the server 100 from the control routine 510 may then be ascribed such an intermediate trust level.

Turning to FIG. 4, in executing the control routine 510, the processor component 650 may initially transmit an indication of the ID 501 to the server 100 to enable the processor component 150, in executing the control routine 110, to verify that the endpoint device 500b is authorized to be part of the network 999. The processor component 550 may then signal the server 100 with an indication of the ability to form the secure enclave 565 within the endpoint device 500b to enable the secure execution of at least the control routine 510. The trust level that may be determined to be assigned to the resulting secure operating environment may be comparable to that assigned to the secure operating environment created by the controller 600 depending on various implementation details in the formation of the secure enclave 565. In some embodiments in which the implementation results in a sufficiently secure operating environment, the endpoint device 500b may store an environment credential 531 within the secure enclave 565 for use in verifying the ability to provide such a secure operating environment. Upon verification through use of such an environment credential, the processor component 150 may determine a relatively high trust level to assign to the secure operating environment provided by the secure enclave 565. Not unlike the endpoint device 500a, the processor component 150 may either itself determine a lower trust level to assign to the operating environment in which at least the application routine 570 is executed, or may signal the processor component 550, in executing the control routine 510 within the secure enclave 565, to determine such a trust level.

Referring to both FIGS. 3 and 4, the trust levels assigned to the different operating environments provided by each of the endpoint devices 500a and 500b may be combined in any of a variety of ways with trust levels otherwise assigned to the endpoint devices 500a and 500b based on other factors, such as their location within the network 999 and/or their physical location. By way of example, based on a principal that security in communications between two devices is only as good as the "weakest link" among the path of communication and among the two devices, themselves, the highest trust level assigned to any operating environment in either of the endpoint devices 500a or 500b may be required to be no higher than the trust level determined based on their locations on the network 999 and/or their physical locations. Stated differently, although one each of the endpoint devices 500a and 500b may provide at least one highly secure operating environment, indications of a malware attack that originate from those secure environments may still not be deemed to be very trustworthy if conveyed through a portion of the network 999 that is not deemed to be sufficiently secure.

Returning to FIG. 1, the fact of the linking device 300 being under the control of personnel given the responsibility of maintaining the network 999 may result in the a determination that the linking device 300 is to be assigned a relatively high trust level. Such network devices are often located in secure areas accessible only to such personnel. Alternatively or additionally, the ascribing of a high trust level to network devices such as the linking device 300 may also be based on such computing devices not being employed to execute application routines at the behest of persons other than those with the responsibility to maintain the network 999. Further, it is commonplace for the control routine 310 of typical implementations of the linking device 300 to be specifically written to resist being corrupted (e.g., "hardened" against malware attack). Thus, a relatively high trust level is likely to be assigned to the linking device 300.

During normal operation these computing devices 100, 300 and 500a-c, and of the network 999, the server 100 awaits receipt of an indication of a possible malware attack (or at least a risk of a malware attack) from one or more of the computing devices 300 and 500a-c. The trust levels assigned to each of these computing devices 300 and 500a-c may be employed by the processor component 150 of the server 100 in determining whether or not a received indication of a possible malware attack should be responded to. By way of example, where the indication originates from the operating environment in which at least the application routine 570 is executed in any of the endpoint devices 500*a-c*, the lower trust level(s) assigned to those environments may be employed as a factor by the processor component 150 of the server 100 determining that such an indication is unreliable, especially if there is no corroborating indication originating from the more highly trusted secure operating environments of the endpoint devices 500*a* or 500*b*, or from the linking device 300.

However, indications from less trusted operating environments and/or less trusted endpoint devices may more readily trigger the processor component 150 to act in situations where there are numerous ones of such indications originating from such less trusted sources. By way of example, if there were numerous ones of the endpoint devices 500*c* coupled to the network 999, and numerous indications of a possible malware attack were received from numerous ones of those less trusted sources, then the fact of receiving numerous indications may override a lesser number of contradictory indications from more highly trusted sources of there being no such attack.

In receiving indications of a possible malware attack (or at least a risk of a malware attack), various mechanisms may be employed to verify that the source of such indications to address the possibility of a less trusted source sending an indication that includes an identifier of a more trusted source, instead of an identifier of the less trusted source (what may be referred to as form of "spoofing"). Among the mechanisms that may be employed may be a distribution of identity credentials among various devices authorized to be part of the network 999, such as encryption keys, digital signatures, certificates, etc. that may be used to mark indications of a possible malware attack that are transmitted into the network 999. In some embodiments, the server 100 may, itself, distribute such identity credentials to one or more of the linking device 300 and/or the endpoint devices 500*a*, 500*b* and/or 500*c*, and then may directly verify the indications it receives of possible malware attacks. In other embodiments, another device of the network 999 (e.g., the linking device 300, or another server) may provide the service of distributing such credentials and then verifying the indications of possible malware attacks before relaying the verified ones of those indications onward to the server 100 for analysis. Various protocols and/or accepted message formats may be employed in the transmission of the indications of possible malware attack and/or in the forwarding of verified ones of such indications.

Such indications, whether from less trusted or more trusted sources, may include an indication of a positive match in detecting a signature pattern of behavior or data pattern associated with a piece of malware, an indication of an unusually high amount of a particular type of network traffic, or an indication of a check performed of a hash of a portion of a routine revealing that the routine has been altered. However, such indications may also be less clear, and may be indications of events ascribable to multiple causes, only one of which may be related to a malware attack, such as an indication of an error in typing a password by an authorized operator of an endpoint device attempting to log into it, or an indication of an endpoint device being left unattended by an operator for longer than a predetermined period of time.

In response to a determination by the processor component 150 to take an action in response to receipt of an indication of a possible malware attack, the processor component 150 may signal one or more of the linking device 300 and the endpoint devices 500*a-c* to transmit logs indicative of at least recent events to the server 100 for analysis. During normal operation, each of the linking device 300 and the endpoint devices 500*a-c* may recurringly update corresponding ones of the log data 336, 536 and 636 with indications of various selected events as they occur over time. For the linking device 300, the log data 336 may include indications of connections and/or disconnections of devices in the network 999 or portions of the network 999, instances of errors occurring in the transmission of packets through the network 999, indications of an unusual pattern of network activity by a device, etc. For each of the endpoint devices 500*a-c*, the log data 536 or 636 may include indications of attempted accesses by a routine to portions of the storage 560 that violate an imposed access restriction, indications of the start and/or end of execution of various routines, indications of an unusual pattern of calls to library routines by a routine, etc.

Returning to FIG. 3, as depicted, the log data 636 may combine indications of events involving the execution of at least one or more of the control routine 510 (if present), the operating system 540 and the application routine 570. At least some of the indications may be added to the log data 636 by the processor component 650 in executing the control routine 610 to monitor execution of various routines by the processor component 550. Alternatively or additionally, at least some of the indications may be provided to the controller 600 to add to the log data 636 as output generated by one or more of the control routine 510, the operating system 540 and the application routine 570. Indications of events added to the log data 636 may be marked or otherwise accompanied by indications of their sources, such as whether an indication is of an event detected by the processor component 650 or is of an event indicated to have occurred by one of the routines executed by the processor component 550. In this way, the processor component 150 of the server 100 is able to associate appropriate trust levels to each indication of an event in the log data 636. Returning to FIG. 4, a similar differentiation may be made between indications in the log data 536 of events detected by the processor component 550 in executing the control routine 510 in the secure operating environment of the secure enclave 565 and indications in the log data of events provided from by the application routine 570 and/or the operating system 540 as they are executed by the processor component 550.

Returning to FIG. 1, the processor component 150, in executing the control routine 110, analyzes the log data 336, 536 and/or 636 requested and received for indications of a malware attack, taking into account the trust levels assigned to the sources of the indications in each of the log data 336, 536 and/or 636. Again, despite a higher trust level ascribed to one source, it may be possible for one or more indications from a less trusted source to be determined to be indications that should be acted upon. It should be noted that in some embodiments, the processor component 150 may recurringly request such log data from various devices coupled to the network on a regular basis, rather than in response to an indication of a possible malware attack.

In response to one or more indications of a malware attack associated with a particular one of the computing devices 500*a-c*, whether or not those indications include indications from log data, the processor component 150 may transmit a request to that particular computing device to provide a copy of the contents of at least part of the storage 560 (e.g., a "snapshot" thereof). It should be noted that the storage 560, though depicted with a single block in the figures hereof, may be made up of multiple storage devices based on different technologies, including and not limited to volatile and/or non-volatile solid-state storage, ferromagnetic storage, optical storage, etc. Thus, by way of example, a request for a snapshot of the contents of at least a portion of the storage 560 may entail capturing a copy of the contents of dynamic or static random access memory, a copy of the contents of NAND-based FLASH memory, and/or a copy of the contents of a hard disk drive.

Returning to FIG. 3, such a snapshot requested of the endpoint device 500a may be responded to with the capturing of a snapshot of the contents of the storage 560 that may include copies of one or more of the control routine 510, the operating system 540 and the application routine 570, as well as any associated data in the storage 560. Upon receipt of such a snapshot, the processor component 150 may store it as the capture data 137 for analysis. Again, trust values may be associated with such snapshots based on received indications of their origins. Thus, presuming the processor component 650 of the controller 600 performed the capturing of the snapshot of at least a portion of the storage 560, the snapshot may be ascribe a relatively high trust level. And again, trust values ascribed to snapshots may be taken into account in analyzing the contents of snapshots.

In embodiments in which the processor component 150 determines that action is to be taken to eradicate malware engaging in an attack in response to analyzing indications of a possible malware attack, including indications that may exist in log data and/or snapshots, the processor component 150 may signal either a network device or an endpoint device to take a specified action. In some embodiments, where the processor component 150 determines that malware is present in an endpoint device incorporating an ability to be remotely reset, the processor component 150 may signal that endpoint device to do so. By way of example, the processor component 150 may signal the processor component 650 of the controller 600 of the endpoint device 500a to reset operation of the processor component 550. In response, the processor component 650 may signal the processor component 550 to reinitialize or "reboot" in an effort to restart execution of one or more of the control routine 510, the operating system 540 and/or the application routine 570, as well as to clear at least a portion of the storage 560 to attempt to eradicate a piece of malware.

Alternatively or additionally, the processor component 150, in response to determining that action is to be taken to eradicate malware, may signal another computing device with a report of having determined that a malware attack is in progress. This may be done to inform personnel of the malware attack to enable them to determine a course of action. The processor component may provide details of the analysis and/or what indications lead to the determination that a malware attack is underway in signaling the other computing device. Alternatively or additionally, the other computing device signaled with a report may employ the details provided in the signal to attempt to eradicate the malware.

Returning to FIG. 1, as an alternative to or in addition to signaling an endpoint device to reset, the processor component 150 may signal the linking device 300 to disconnect an endpoint device determined to be associated with a malware attack from the network 999. In response to such a signal, the processor component 350, in executing the control routine 310, may commence ignoring signals received from the specified endpoint device and refrain from transmitting signals to that endpoint device.

Figure 5:
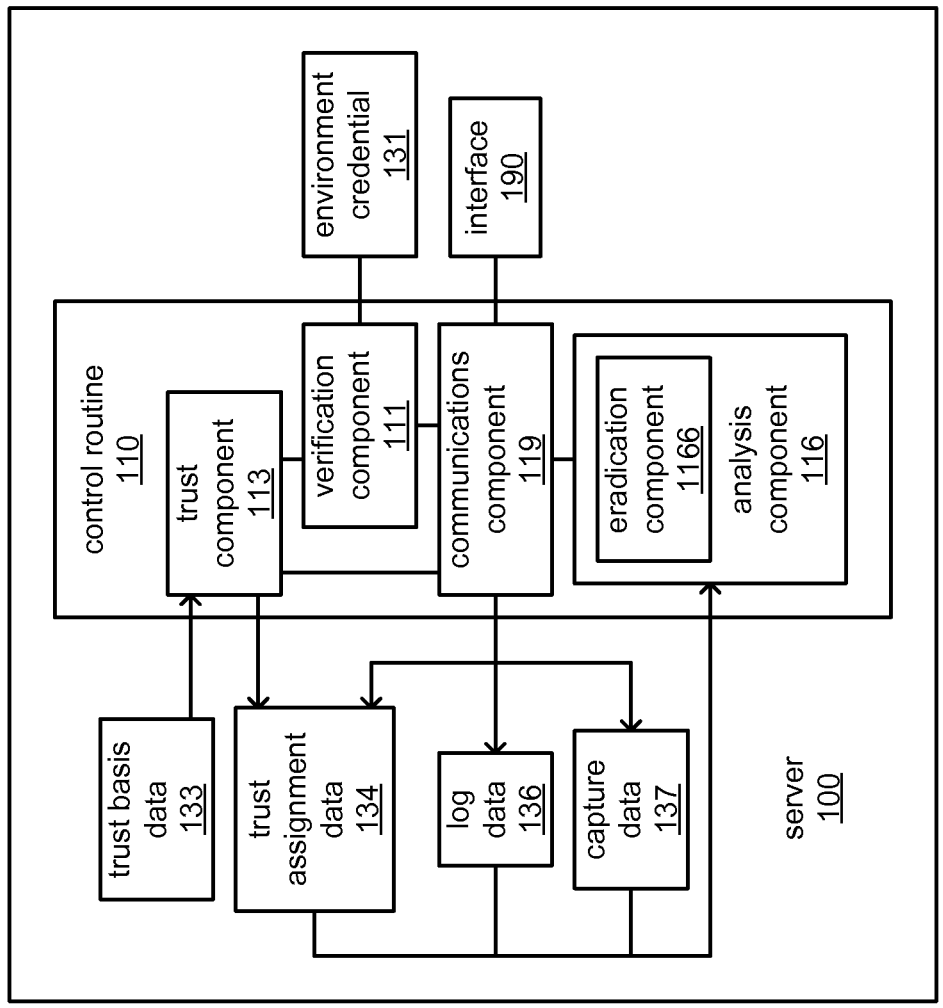
FIGS. 5-7 each illustrate a portion of an embodiment of a malware detection system.
Figure 6:
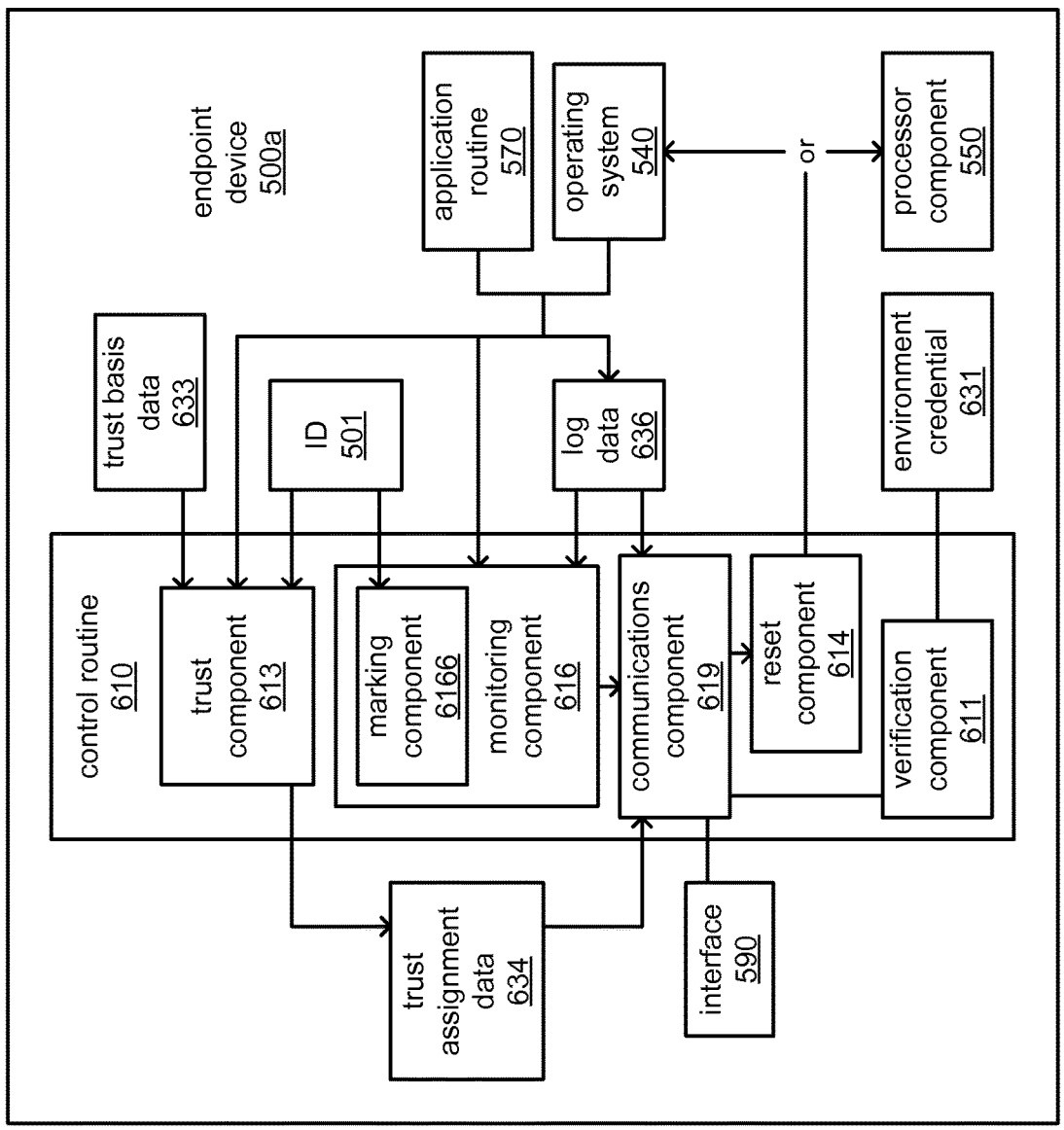
Figure 7:
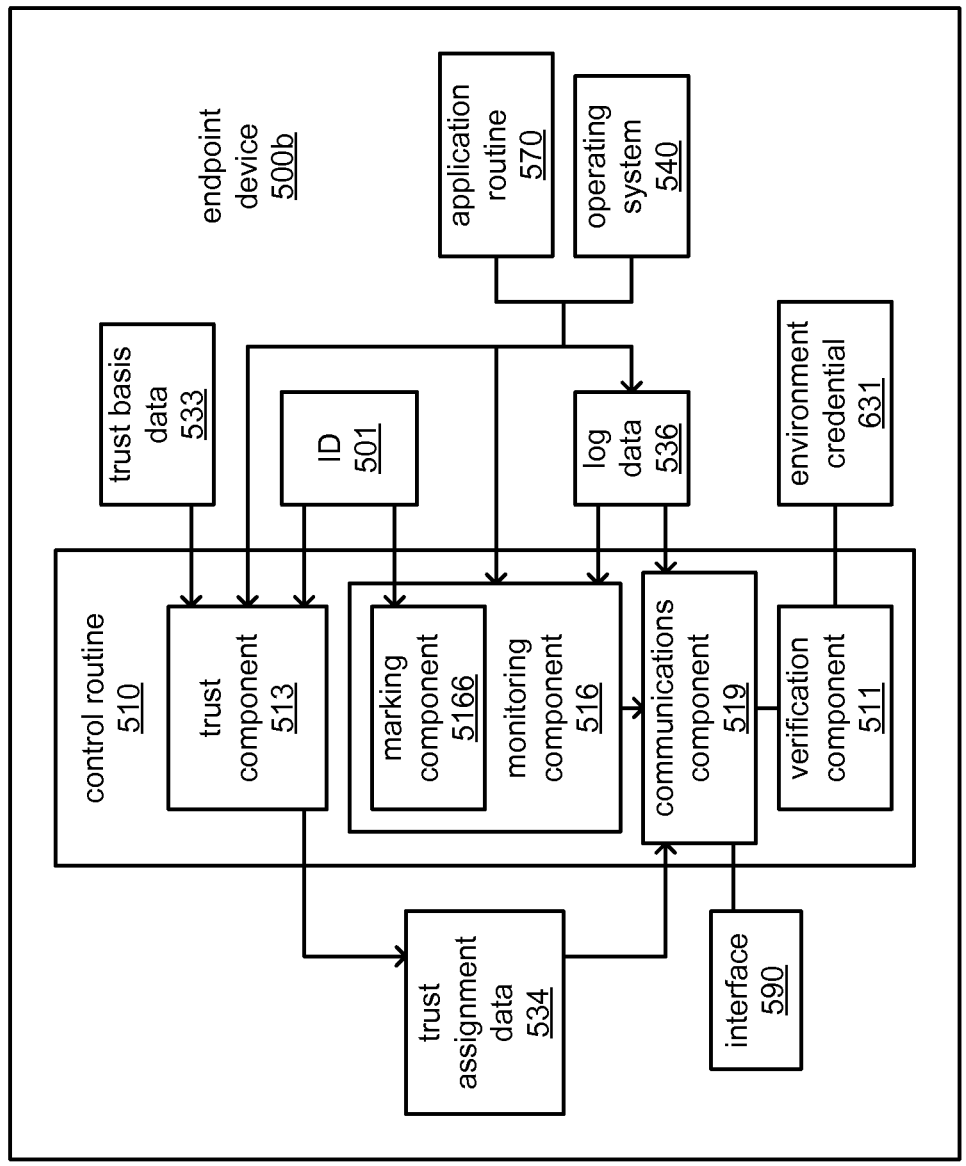

FIGS. 5, 6 and 7 each illustrate a block diagram of a portion of an embodiment of the malware detection system 1000 of FIG. 1 in greater detail. More specifically, FIG. 5 depicts aspects of the operating environment of the server 100 in which the processor component 150, in executing the control routine 110, assigns trust levels to other computing devices and employs those trust levels in analyzing information that may be indicative of a malware attack. FIG. 6 depicts aspects of the operating environment of the endpoint device 500a in which the processor component 650, in executing the control routine 610, provides a secure operating environment within the controller 600 and monitors the execution of routines by the processor component 550. FIG. 7 depicts aspects of the operating environment of the endpoint device 500b in which the processor component 550, in executing the control routine 510, provides a secure operating environment within the secure enclave 565 and monitors the execution of routines by the processor component 550 outside the secure enclave 565.

As recognizable to those skilled in the art, the control routines 110, 510 and 610, including the components of which each is composed, are selected to be operative on whatever type of processor or processors that are selected to implement applicable ones of the processor components 150, 550 or 650. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 150, 550 or 650. Where one or more device drivers are included, those device drivers may provide support for any of a variety of other components, whether hardware or software components, of corresponding ones of the computing devices 100, 500a or 500b, as well as the controller 600.

Each of the control routines 110, 510 and 610, may include a communications component 119, 519 and/or 619, respectively, executable by an applicable one of the processor components 150, 550 or 650 to operate an applicable one of the interfaces 190 or 590 to transmit and receive signals via the network 999 as has been described. Among the signals exchanged may be signals conveying identifiers of computing devices, security credentials and/or indications of malware attacks among one or more of the computing devices 100, 300 and 500a-c via the network 999. As recognizable to those skilled in the art, these communications components are selected to be operable with whatever type of interface technology is selected to implement corresponding ones of the interfaces 190 and 590.

Turning more specifically to FIG. 5, the control routine 110 may include a verification component 111 executable by the processor component 150 to employ the environment credential 131 to verify whatever credential may be transmitted to the server 100 by one of endpoint devices 500a or 500b to verify their ability to provide a secure operating environment. As previously discussed, any of a variety of verification mechanisms may be used, including and not limited to, exchanges of signatures, signed credentials, etc.

The control routine 110 may include a trust component 113 executable by the processor component 150 to determine at least one trust level associated with one or more endpoint devices and/or network devices (e.g., linking devices). As has been discussed, one or more endpoint devices (e.g., the endpoint devices 500*a* or 500*b*) may be assigned more than one trust level where such endpoint devices provide multiple operating environments, including a secure operating environment.

The trust component 113 may initially receive an identifier of a device coupled to the network 999 and compare it to indications of identifiers of that may be included in the trust basis data 133 to determine whether that device is authorized to be part of the network 999 before determining what trust value to assign to it. As has been discussed, trust values may be based on the location of a device in the network 999, on the physical location of a device, on explicit indications of trust values that may be provided within the trust basis data 133, on verification of the ability to provide a secure operating environment in addition to another less secure operating environment, and/or on being a network device securely maintained by personnel tasked with maintaining the network 999, among other possible considerations.

The trust component 113 may signal a network device (e.g., the linking device 300) or an endpoint device providing a secure operating environment to assist in assigning trust levels, and may receive indications of those trust values from those other devices. The trust component 113 may store trust levels, whether determined by the trust component 113 or received from other devices, in the trust assignment data 134 correlated with indications of the identifiers of each device to which they are assigned.

The control routine 110 may include an analysis component 116 executable by the processor component 150 to receive and analyze indications of malware attacks received from other computing devices coupled to the network (e.g., the linking device 300 and the endpoint devices 500*a-c*). As previously discussed, such indications may include log data received from other computing devices and stored as the log data 136, and/or snapshots of contents of storages received from other computing devices and stored as the capture data 137. In analyzing the received indications, the analysis component refers to the trust assignment data 134 to associate trust levels with the sources of each of those received indications, and employs those trust levels as factors in the analysis.

The analysis component 116 may include an eradication component 1166 to determine one or more actions to take in response to a determination from the analysis that there is a malware attack requiring a response. As has been discussed, the action to take may be determined in part based on the capabilities of an endpoint device and/or other device associated with the malware attack. By way of example, the action may be to signal an endpoint device associated with a malware attack and capable of being remotely reset through the network 999 with a command to do so. Alternatively, either in lieu of taking direct action to eradicate malware or in addition to taking such direct action, the eradication component may signal another computing device with a report of the determination of there being a malware attack in progress. Again, such a report may include details of the one or more indications from which the determination was made (e.g., a copy of a log or snapshot) to enable either personnel and/or another computing device to take action.

In embodiments in which the server 100, itself, verifies sources of indications of possible malware attacks, the verification component 111 may additionally employ various identification credentials in verifying such indications received by the communications component 119. The verification component may also generate and/or distribute such credentials to one or more of the other devices authorized to be part of the network 999 (e.g., the linking device 300 and/or one or more of the endpoint devices 500*a*, 500*b* and/or 500*c*). Again, such identification credentials may be based on any of a variety of techniques of identity verification, including and not limited to, associated sets of keys, digital signatures, certificates, etc.

Turning more specifically to FIGS. 6 and 7, the control routines 510 and 610 may include a verification component 511 and 611 executable by the processor components 550 and 650 to employ the environment credential 531 and 631 to verify the ability of the endpoint devices 500*b* and 500*a*, respectively, to provide a secure operating environment. Again, any of a variety of verification mechanisms may be used, including and not limited to, exchanges of signatures, signed credentials, etc.

The control routines 510 and 610 may include a trust component 513 and 613 executable by the processor components 550 and 650 to determine at least one trust level associated with at least one operating environment provided within the endpoint devices 500*b* and 500*a*, respectively. The trust component 513 or 613 may also transmit an indication of the identifier 501 to the server 100 as part of enabling the server 100 to determine a trust level for the endpoint device 500*b* or 500*a*, respectively. As has been discussed, a signal may be received from the server 100 requesting that the endpoint device 500*b* or 500*a* assist in determining trust levels. In response, the trust component 513 or 613 employs indications of rules and/or other information germane to secure operation of the endpoint device 500*b* or 500*a* to determine at least one trust level, store it as the trust assignment data 534 or 634, respectively, and then transmit an indication of that trust level to the server 100.

The control routines 510 and 610 may include a monitoring component 516 and 616 executable by the processor components 550 and 650, respectively, to monitor the execution of one or more routines (e.g., the operating system 540 and/or the application routine 570) for a malware attack against such execution. Upon detecting a malware attack (or at least some evidence of a possible malware attack), the monitoring component 516 or 616 may transmit an indication of the malware attack to the server 100. The monitoring component 516 or 616 may include a marking component 5166 or 6166 to mark such transmitted indications with the identifier 501 to enable the server 100 to associate the indication with the trust level assigned to the endpoint device 500*b* or 500*a*, respectively. Alternatively or additionally, the marking component 5166 or 6166 may mark such transmitted indications with an indicator of which operating environment is the one in which a routine detected the malware attack to enable the server 100 to associate the indication with the trust level assigned to that operating environment.

In embodiments in which a mechanism is employed to verify sources of such transmitted indications, the marking component 5166 or 6166 may alternatively or additionally mark such transmitted indications with an identification credential assigned to the endpoint devices 500*a* and/or 500*b*, or assigned to the secure operating environments of the endpoint devices 500*a* and/or 500*b*. Depending on the mechanism used, such marking of the transmitted indications may include one of various forms of digitally signing such transmitted indications with an identification credential to prove that the transmitted indications emanate from the sources that they are represented as emanating from.

Turning solely to FIG. 6, the control routine 610 may include a reset component 614 executable by the processor component 650 to receive a command from the server 100 to reset at least the execution of one or more routines by the processor component 550. In response to receiving such a command, the reset component 614 may signal the operating system 540 to "reboot" and/or may signal the processor component 550 to reset.

Figure 8:
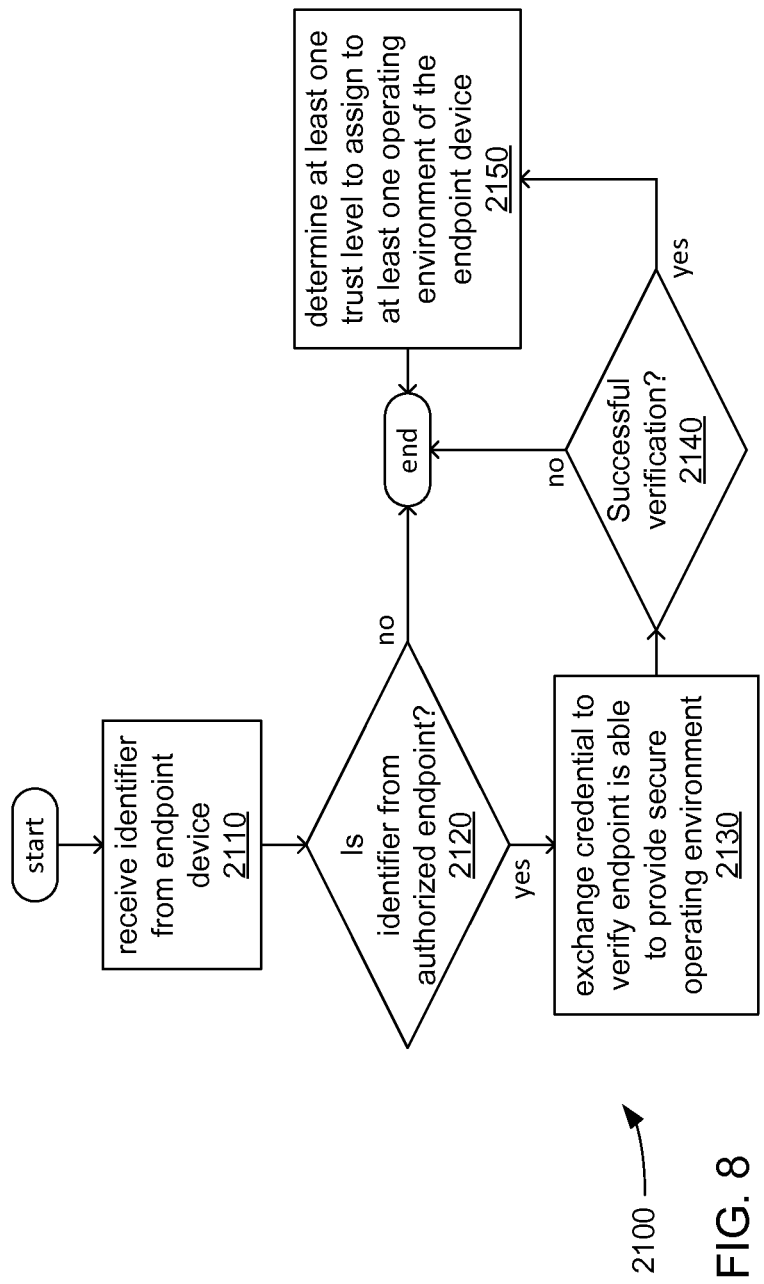
FIGS. 8-9 each illustrate a logic flow according to an embodiment.

FIG. 8 illustrates one embodiment of a logic flow 2100. The logic flow 2100 may be representative of some or all of the operations executed by one or more embodiments described herein. More specifically, the logic flow 2100 may illustrate operations performed by the processor component 150 in executing at least the control routine 110, and/or performed by other component(s) of the server 100.

At 2110, a processor component of a server of a malware detection system (e.g., the processor component 150 of the server 100 of the malware detection system 1000) receives an identifier from an endpoint device (e.g., the ID 501 of one of the endpoint devices 500a-c). As previously discussed, the identifier may be unique to each endpoint device, and may be an identifier uniquely assigned to the processor component or the interface of each endpoint device. At 2120, a check is made as to whether the identifier is from an endpoint device authorized to be part of the network to which the server is coupled (e.g., the network 999).

If the endpoint device is so authorized, then at 2130, at least one credential is exchanged to verify that the endpoint device is able to provide a secure operating environment. Again, an endpoint device may be capable of providing a secure operating environment in addition to one or more less secure operating environments. This may enable a control routine to be executed in the secure operating environment to monitor the execution of other routines in the less secure operating environment(s) (e.g., the operating system 540 and/or the application routine 570) for evidence of a malware attack, and to transmit an indication of the malware attack to the server.

At 2140, a check is made as to whether such verification of the endpoint device having such a capability is successful. If not, then the server may cease to take any further action to either accept the endpoint device in the network or to provide it a trust level on the basis that failure to verify such a credential may be an indication that even the most secure portion of that endpoint device has already been compromised.

However, if verification of the ability of the endpoint device to provide such a secure operating environment is successful, then the server determines at least one trust level to assign to at least one of the operating environments provided by the endpoint device. As has been discussed, the server may determine a trust level to assign to the secure operating environment, and may either determine trust level(s) to assign to the other operating environment(s) of the endpoint device, or may signal the endpoint device to do so.

Figure 9:
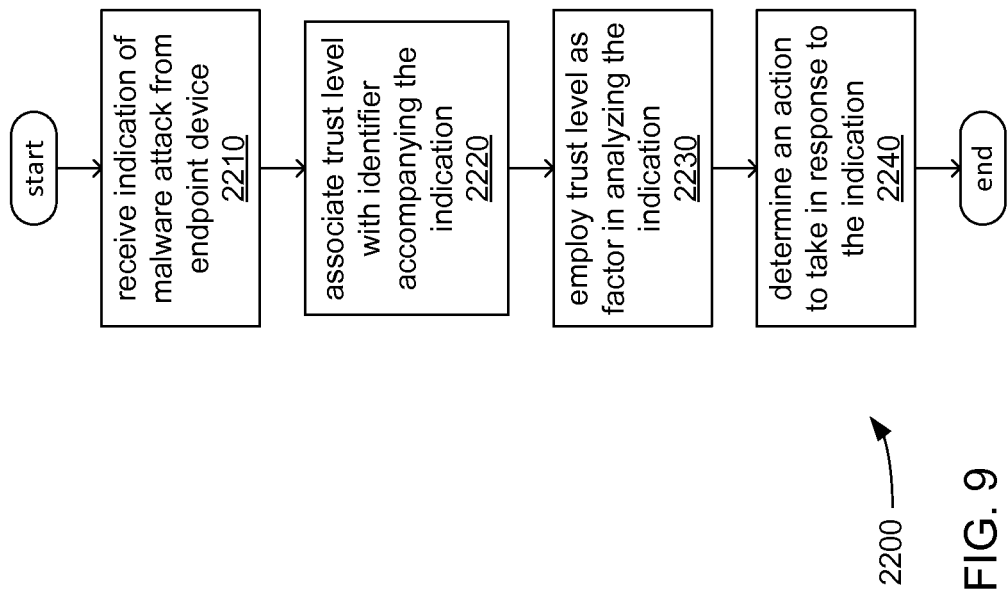

FIG. 9 illustrates one embodiment of a logic flow 2200. The logic flow 2200 may be representative of some or all of the operations executed by one or more embodiments described herein. More specifically, the logic flow 2200 may illustrate operations performed by the processor component 150 in executing at least the control routine 110, and/or performed by other component(s) of the server 100. These operations may be performed as part of implementing an embodiment of a SIEM system in analyzing indications of and determining a response to a possible malware attack.

At 2210, a processor component of a server of a malware detection system (e.g., the processor component 150 of the server 100 of the malware detection system 1000) receives an indication from an endpoint device (e.g., one of the endpoint devices 500a-c) of a malware attack. As previously discussed, such an indication may be an indicator of a piece of malware having been positively identified, an indication of corruption of a routine within the endpoint device, an indication of a routine attempting to access a portion of a storage subject to access restrictions, an indication of an abnormal pattern of activity by a routine within the endpoint device, etc.

At 2220, the server associates a trust level with an identifier accompanying the indication of a malware attack. As has been discussed, indications of malware attacks may be marked or otherwise accompanied by an identifier or other indicator of what endpoint device transmitted the indication of the malware attack and/or what operating environment within an endpoint device originated the indication. Such specific identification of operating environments may arise as a result of one of the operating environments being a secure operating environment, while another is not such that different trust levels are assigned to each.

As has also been discussed, indications of malware attacks may also be marked by or otherwise accompanied by an identification credential enable the source of the indication to be verified against the possibility of a lesser trusted source (e.g., an endpoint or an operating environment of an endpoint assigned a lower trust level) from representing the indication as originating from a more trusted source (e.g., an endpoint or an operating environment of an endpoint assigned a higher trust level). In some embodiments, the server may directly verify the sources of the indications. In other embodiments, the server may rely on another device of the malware detection system to perform such verification and relay verified ones of the indications to the server.

At 2230, the server employs the trust level as a factor in analyzing the indication of the malware attack. As has been discussed, the trust level may be employed as a weighting factor in analyzing the indication, especially where the indication is accompanied by other corroborating and/or contradictory indications from other devices in the network and/or other operating environments of the endpoint device.

At 2240, the server determines an action to take in response to the analysis of the indication. As has been discussed, the action may be to request more information from the endpoint device and/or other devices in the network, such as log data (e.g., the log data 136, 336, 536 and/or 636) and/or a capture of a snapshot made up of a copy of contents of a storage of the endpoint device. As has also been discussed, the action may be to signal the endpoint device to reset in embodiments in which the endpoint device is capable of performing such a function, and/or to signal a network device (e.g., the linking device 300) to disconnect the endpoint device from the network.

Figure 10:
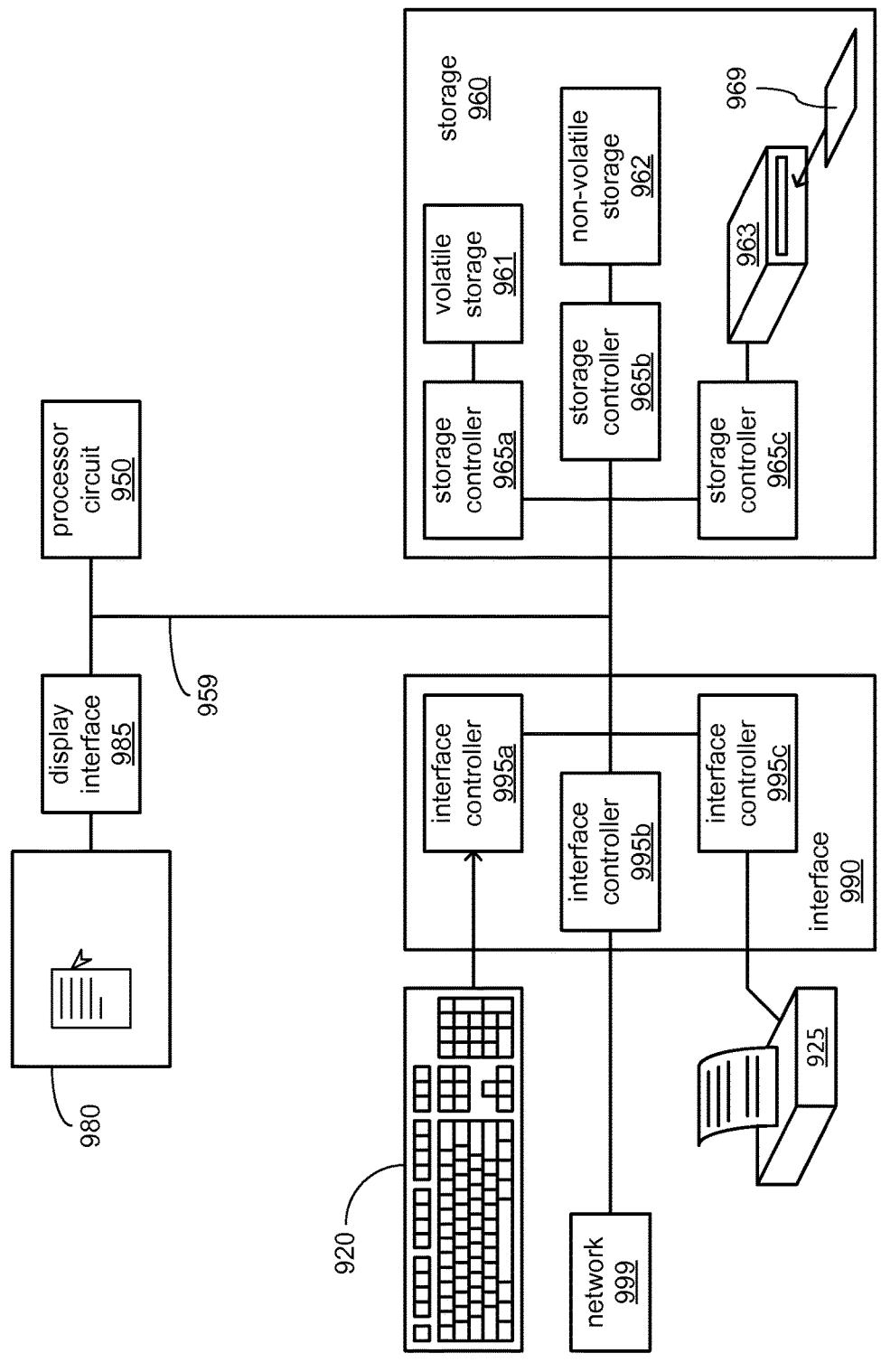
FIG. 10 illustrates a processing architecture according to an embodiment.

FIG. 10 illustrates an embodiment of a processing architecture 3000 suitable for implementing various embodiments as previously described. More specifically, the processing architecture 3000 (or variants thereof) may be implemented as part of one or more of the computing devices 100, 300 or 500a-c, and/or by the controller 600. It should be noted that components of the processing architecture 3000 are given reference numbers in which the last two digits correspond to the last two digits of reference numbers of at least some of the components earlier depicted and described as part of these computing devices. This is done as an aid to correlating components of each.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 959. Depending on various aspects of a computing device implementing the processing architecture 3000, including its intended use and/or conditions of use, such a computing device may further include additional components, such as without limitation, a display interface 985, or one or more processing subsystems 900.

The coupling 959 may include one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 150, 350, 550 or 650) may include any of a wide variety of commercially available processors, employing any of a wide variety of technologies and implemented with one or more cores physically combined in any of a number of ways.

As previously discussed, the storage 960 (corresponding to one or more of the storages 160, 360, 560 or 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to one or more of the interfaces 190, 390 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus to detect malware includes a processor component, an analysis component for execution by the processor component to employ a trust level assigned to an operating environment of a device in a network as a factor in an analysis of an indication received from the device of a malware attack, and an eradication component for execution by the processor component to determine an action to take through the network to eradicate the malware attack based on the analysis.

In Example 2, which includes the subject matter of Example 1, the apparatus may include a trust component for execution by the processor component to determine the trust level based on a location of the device in the network.

In Example 3, which includes the subject matter of any of Examples 1-2, the apparatus may include at least one of a portion of the network secured against physical access, a portion of the network in which encryption is employed, a portion of the network in which a virtual private network (VPN) is formed, or a portion of the network that includes a publicly accessible network.

In Example 4, which includes the subject matter of any of Examples 1-3, the apparatus may include a trust component for execution by the processor component to determine the trust level based on a physical location of the device.

In Example 5, which includes the subject matter of any of Examples 1-4, the physical location may include at least one of a secured building, a secured room, or a desk assigned to a known operator.

In Example 6, which includes the subject matter of any of Examples 1-5, the apparatus may include a verification component for execution by the processor component to verify an ability of the device to provide a secure operating environment in addition to a less secure operating environment based on a verification of a credential received from the device, the operating environment comprising at least one of the secure operating environment or the less secure operating environment; and a trust component for execution by the processor component to determine the trust level based on the verification.

In Example 7, which includes the subject matter of any of Examples 1-6, the eradication component may determine the action based on the verification, the action comprising signaling the device through the network to reset.

In Example 8, which includes the subject matter of any of Examples 1-7, the trust component may assign the trust level to the secure operating environment and to assign another trust level to the less secure operating environment, the other trust level determined to be a lesser level of trust than the trust level.

In Example 9, which includes the subject matter of any of Examples 1-8, the indication may include at least one of an indication of an occurrence on the network of a pattern of accesses associated with the malware attack, an indication of an occurrence within the device of a pattern of function calls associated with the malware attack, an indication of a change to a hash of a portion of a routine of the device, an indication of an attempted access to a portion of a storage of the device subject to access restrictions, an indication of an instance of an operator entering an incorrect password to access the device, an indication of the device left unattended by an authorized operator for longer than a specified period of time, a log of events associated with execution of at least one routine within the device, or a snapshot of contents of a portion of a storage of the device.

In Example 10, which includes the subject matter of any of Examples 1-9, the action may include signaling another device in the network to disconnect the device from the network.

In Example 11, which includes the subject matter of any of Examples 1-10, the analysis component may employ a plurality of trust levels assigned to a plurality of devices in the network as factors in the analysis of the indication, the plurality of trust levels comprising the trust level and the plurality of devices comprising the device.

In Example 12, which includes the subject matter of any of Examples 1-11, the analysis component may employ each trust level of the plurality of trust levels as a weighting factor associated with each of a plurality of indications of a malware attack, the plurality of indications comprising the indication.

In Example 13, an apparatus to detect malware includes a processor component, a trust component for execution by the processor component to determine a first trust level for a secure operating environment of a device in a network and a second trust level for a less secure operating environment based at least on a verification that the device is able to provide the secure operating environment in addition to the less secure operating environment, and an analysis component for execution by the processor component to employ one of the first and second trust levels in an analysis of an indication of a malware attack received from the device based on whether the indication originates from the secure operating environment or the less secure operating environment.

In Example 14, which includes the subject matter of Example 13, the apparatus may include a verification component for execution by the processor component to verify the ability of the device to provide the secure operating environment in addition to the less secure operating environment based on a verification of a credential exchanged with the device.

In Example 15, which includes the subject matter of any of Examples 13-14, the apparatus may include an eradication component for execution by the processor component to determine an action to take through the network to eradicate the malware attack based on the analysis.

In Example 16, which includes the subject matter of any of Examples 13-15, the action may include at least one of signaling the device to reset or signaling another device in the network to disconnect the device from the network.

In Example 17, which includes the subject matter of any of Examples 13-16, the trust component may determine one of the first and second trust levels based at least on a location of the device in the network.

In Example 18, which includes the subject matter of any of Examples 13-17, the location may include at least one of a portion of the network secured against physical access, a portion of the network in which encryption is employed, a portion of the network in which a virtual private network (VPN) is formed, or a portion of the network that includes a publicly accessible network.

In Example 19, which includes the subject matter of any of Examples 13-18, the trust component may determine one of the first and second trust levels based at least on a physical location of the device.

In Example 20, which includes the subject matter of any of Examples 13-19, the physical location may include at least one of a secured building, a secured room, or a desk assigned to a known operator of the device.

In Example 21, which includes the subject matter of any of Examples 13-20, the analysis component may employ a plurality of trust levels assigned to a plurality of devices in the network as factors in the analysis of the indication, the plurality of trust levels comprising the first and second trust levels and the plurality of devices comprising the device.

In Example 22, which includes the subject matter of any of Examples 13-21, the analysis component may employ each trust level of the plurality of trust levels as a weighting factor associated with each of a plurality of indications of a malware attack, the plurality of indications comprising the indication.

In Example 23, an apparatus to detect malware includes a processor component, a verification component for execution by the processor component within a secure operating environment to transmit a credential to verify an ability to provide the secure operating environment in addition to a less secure operating environment, and a marking component to mark an indication of a malware attack transmitted to another device through a network with an indication of whether the indication originates from a first routine executed in the secure operating environment or from a second routine executed in the less secure operating environment.

In Example 24, which includes the subject matter of Example 23, the apparatus may include a monitoring component for execution by the processor component within the secure operating environment to monitor execution of at least one of an operating system or an application routine in the less secure operating environment for the malware attack.

In Example 25, which includes the subject matter of any of Examples 23-24, the apparatus may include a trust component for execution by the processor component within the secure operating environment to determine a trust level for the less secure operating environment.

In Example 26, which includes the subject matter of any of Examples 23-25, the apparatus may include a reset component for execution by the processor component within the secure operating environment to reinitialize at least execution of an operating system within the less secure operating environment in response to receipt of a command through the network to do so.

In Example 27, which includes the subject matter of any of Examples 23-26, the apparatus may include another processor component to execute at least one of an operating system or an application routine within the less secure operating environment.

In Example 28, which includes the subject matter of any of Examples 23-27, the apparatus may include a reset component for execution by the processor component within the secure operating environment to signal the other processor component to reinitialize execution of at least the operating system within the less secure operating environment in response to receipt of a command through the network to do so.

In Example 29, a computer-implemented method for detecting malware may include associating a trust level assigned to a device in a network with an indication of a malware attack received via the network from the device, employing the trust level as a factor in an analysis of the indication, and determining an action to take through the network to eradicate the malware attack based on the analysis.

In Example 30, which includes the subject matter of Example 29, the method may include determining the trust level based on a location of the device in the network.

In Example 31, which includes the subject matter of any of Examples 29-30, the location may include at least one of a portion of the network secured against physical access, a portion of the network in which encryption is employed, a portion of the network in which a virtual private network (VPN) is formed, or a portion of the network that includes a publicly accessible network.

In Example 32, which includes the subject matter of any of Examples 29-31, the method may include determining the trust level based on a physical location of the device.

In Example 33, which includes the subject matter of any of Examples 29-32, the physical location may include at least one of a secured building, a secured room, or a desk assigned to a known operator.

In Example 34, which includes the subject matter of any of Examples 29-33, the method may include receiving a credential from the device via the network, verifying an ability of the device to provide a secure operating environment in addition to a less secure operating environment based on a verification of the credential, and determining the trust level based on the verification.

In Example 35, which includes the subject matter of any of Examples 29-34, the method may include determining the action based on the verification, the action comprising signaling the device through the network to reset.

In Example 36, which includes the subject matter of any of Examples 29-35, the method may include assigning the trust level to the secure operating environment, determining another trust level of the less secure operating environment, and assigning the other trust level to the less secure operating environment.

In Example 37, which includes the subject matter of any of Examples 29-36, the indication may include at least one of an indication of an occurrence on the network of a pattern of accesses associated with the malware attack, an indication of an occurrence within the device of a pattern of function calls associated with the malware attack, an indication of a change to a hash of a portion of a routine of the device, an indication of an attempted access to a portion of a storage of the device subject to access restrictions, an indication of an instance of an operator entering an incorrect password to access the device, an indication of the device left unattended by an authorized operator for longer than a specified period of time, a log of events associated with execution of at least one routine within the device, or a snapshot of contents of a portion of a storage of the device.

In Example 38, which includes the subject matter of any of Examples 29-37, the action may include signaling another device in the network to disconnect the device from the network.

In Example 39, which includes the subject matter of any of Examples 29-38, the method may include employing a plurality of trust levels assigned to a plurality of devices in the network as factors in the analysis of the indication, the plurality of trust levels comprising the trust level and the plurality of devices comprising the device.

In Example 40, which includes the subject matter of any of Examples 29-39, the method may include employing each trust level of the plurality of trust levels as a weighting factor associated with each of a plurality of indications of a malware attack, the plurality of indications comprising the indication.

In Example 41, at least one machine-readable storage medium includes instructions that when executed by a processor component, cause the processor component to associate a trust level assigned to a device in a network with an indication of a malware attack received via the network from the device, employ the trust level as a factor in an analysis of the indication, and determine an action to take through the network to eradicate the malware attack based on the analysis.

In Example 42, which includes the subject matter of Example 41, the processor component may be caused to determine the trust level based on a location of the device in the network.

In Example 43, which includes the subject matter of any of Examples 41-42, the location may include at least one of a portion of the network secured against physical access, a portion of the network in which encryption is employed, a portion of the network in which a virtual private network (VPN) is formed, or a portion of the network that includes a publicly accessible network.

In Example 44, which includes the subject matter of any of Examples 41-43, the processor component may be caused to determine the trust level based on a physical location of the device.

In Example 45, which includes the subject matter of any of Examples 41-44, the physical location may include at least one of a secured building, a secured room, or a desk assigned to a known operator.

In Example 46, which includes the subject matter of any of Examples 41-45, the processor component may be caused to receive a credential from the device via the network, verify an ability of the device to provide a secure operating environment in addition to a less secure operating environment based on a verification of the credential, and determine the trust level based on the verification.

In Example 47, which includes the subject matter of any of Examples 41-46, the processor component may be caused to determine the action based on the verification, the action comprising signaling the device through the network to reset.

In Example 48, which includes the subject matter of any of Examples 41-47, the processor component may be caused to assign the trust level to the secure operating environment, determine another trust level of the less secure operating environment, and assign the other trust level to the less secure operating environment.

In Example 49, which includes the subject matter of any of Examples 41-48, the indication may include at least one of an indication of an occurrence on the network of a pattern of accesses associated with the malware attack, an indication of an occurrence within the device of a pattern of function calls associated with the malware attack, an indication of a change to a hash of a portion of a routine of the device, an indication of an attempted access to a portion of a storage of the device subject to access restrictions, an indication of an instance of an operator entering an incorrect password to access the device, an indication of the device left unattended by an authorized operator for longer than a specified period of time, a log of events associated with execution of at least one routine within the device, or a snapshot of contents of a portion of a storage of the device.

In Example 50, which includes the subject matter of any of Examples 41-49, the action comprising signaling another device in the network to disconnect the device from the network.

In Example 51, which includes the subject matter of any of Examples 41-50, the processor component may be caused to employ a plurality of trust levels assigned to a plurality of devices in the network as factors in the analysis of the indication, the plurality of trust levels comprising the trust level and the plurality of devices comprising the device.

In Example 52, which includes the subject matter of any of Examples 41-51, the processor component may be caused to employ each trust level of the plurality of trust levels as a weighting factor associated with each of a plurality of indications of a malware attack, the plurality of indications comprising the indication.

In Example 53, an apparatus to detect malware includes means for associating a trust level assigned to a device in a network with an indication of a malware attack received via the network from the device, employing the trust level as a factor in an analysis of the indication, and determining an action to take through the network to eradicate the malware attack based on the analysis.

In Example 54, which includes the subject matter of Example 53, the apparatus may include means for determining the trust level based on a location of the device in the network.

In Example 55, which includes the subject matter of any of Examples 53-54, the location may include at least one of a portion of the network secured against physical access, a portion of the network in which encryption is employed, a portion of the network in which a virtual private network (VPN) is formed, or a portion of the network that includes a publicly accessible network.

In Example 56, which includes the subject matter of any of Examples 53-55, the apparatus may include means for determining the trust level based on a physical location of the device.

In Example 57, which includes the subject matter of any of Examples 53-56, the physical location may include at least one of a secured building, a secured room, or a desk assigned to a known operator.

In Example 58, which includes the subject matter of any of Examples 53-57, the apparatus may include means for receiving a credential from the device via the network, verifying an ability of the device to provide a secure operating environment in addition to a less secure operating environment based on a verification of the credential, and determining the trust level based on the verification.

In Example 59, which includes the subject matter of any of Examples 53-58, the apparatus may include means for determining the action based on the verification, the action comprising signaling the device through the network to reset.

In Example 60, which includes the subject matter of any of Examples 53-59, the apparatus may include means for assigning the trust level to the secure operating environment, determining another trust level of the less secure operating environment, and assigning the other trust level to the less secure operating environment.

In Example 61, which includes the subject matter of any of Examples 53-60, the indication may include at least one of an indication of an occurrence on the network of a pattern of accesses associated with the malware attack, an indication of an occurrence within the device of a pattern of function calls associated with the malware attack, an indication of a change to a hash of a portion of a routine of the device, an indication of an attempted access to a portion of a storage of the device subject to access restrictions, an indication of an instance of an operator entering an incorrect password to access the device, an indication of the device left unattended by an authorized operator for longer than a specified period of time, a log of events associated with execution of at least one routine within the device, or a snapshot of contents of a portion of a storage of the device.

In Example 62, which includes the subject matter of any of Examples 53-61, the action may include signaling another device in the network to disconnect the device from the network.

In Example 63, which includes the subject matter of any of Examples 53-62, the apparatus may include means for employing a plurality of trust levels assigned to a plurality of devices in the network as factors in the analysis of the indication, the plurality of trust levels comprising the trust level and the plurality of devices comprising the device.

In Example 64, which includes the subject matter of any of Examples 53-63, the apparatus may include means for employing each trust level of the plurality of trust levels as a weighting factor associated with each of a plurality of indications of a malware attack, the plurality of indications comprising the indication.

In Example 65, at least one machine-readable storage medium may include instructions that when executed by a processor component, cause the processor component to perform any of the above.

In Example 66, an apparatus detect malware may include means for performing any of the above.

The invention claimed is:

1. An apparatus to detect malware comprising:
a processor component;
an analysis component for execution by the processor component to employ a first trust level, of a plurality of trust levels, assigned to a first operating environment of a device in a network as a factor in an analysis of an indication received from the first operating environment of the device of a malware attack, the indication to indicate an activity of a routine executed in the first operating environment and the indication to indicate a change to a hash of a portion of the routine, the plurality of trust levels assigned to a plurality of devices in the network, the analysis component to employ each trust level as a weighting factor associated with each of a plurality of indications of a malware attack, the plurality of indications comprising the received indication; and
an eradication component for execution by the processor component to determine an action to take through the network to eradicate the malware attack based on the analysis and take the action, the action comprising eradicating the malware attack based on the analysis, the action to include a request of information from a second operating environment of the device assigned a second trust level of the plurality of trust levels, the information collected by the second operating environment via monitoring the activity of the routine executed in the first operating environment.

2. The apparatus of claim 1, comprising a trust component for execution by the processor component to determine the first trust level based on at least one of a location of the device in the network or a physical location of the device.

3. The apparatus of claim 1, comprising:
a verification component for execution by the processor component to verify an ability of the device to provide a secure operating environment in addition to a less secure operating environment based on a verification of a credential received from the device, the first operating environment comprising the less secure operating environment and the second operating environment comprising the secure operating environment; and
a trust component for execution by the processor component to determine the second trust level based on the verification.

4. The apparatus of claim 3, eradication component to determine the action based on the verification, the action comprising signaling the first operating environment of the device through the network to reset.

5. The apparatus of claim 3, the trust component to assign the second trust level to the secure operating environment and to assign the first trust level to the less secure operating environment, the first trust level determined to be a lesser level of trust than the second trust level.

6. The apparatus of claim 1, the indication comprising at least one of an indication of an occurrence on the network of a pattern of accesses associated with the malware attack, an indication of an occurrence within the device of a pattern of function calls associated with the malware attack, an indication of an attempted access to a portion of a storage of the device subject to access restrictions, an indication of an instance of an operator entering an incorrect password to access the device, an indication of the device left unattended by an authorized operator for longer than a specified period of time, a log of events associated with execution of at least one routine within the device, or a snapshot of contents of a portion of a storage of the device.

7. The apparatus of claim 1, the action comprising signaling another device in the network to disconnect the device from the network.

8. A computer-implemented method for detecting malware comprising:
associating a first trust level, of a plurality of trust levels, assigned to a first operating environment of a device in a network with an indication of a malware attack received via the network from the first operating environment of the device, the indication to indicate an activity of a routine executed in the first operating environment and the indication to indicate a change to a hash of a portion of the routine, the plurality of trust levels assigned to a plurality of devices in the network;

employing each of the plurality of trust levels as a factor in an analysis of a plurality of indications including the indication;

determining an action to take through the network to eradicate the malware attack based on the analysis; and taking the action to eradicate the malware attack based on the analysis, the action including a request of information from a second operating environment of the device assigned a second trust level of the plurality of trust levels, the information collected by the second operating environment via monitoring the activity of the routine executed in the first operating environment.

9. The computer-implemented method of claim 8, comprising determining the first trust level based on at least one of a location of the device in the network or a physical location of the device.

10. The computer-implemented method of claim 8, comprising:

receiving a credential from the device via the network;

verifying an ability of the device to provide a secure operating environment in addition to a less secure operating environment based on a verification of the credential, the first operating environment comprising the less secure operating environment and the second operating environment comprising the secure operating environment; and determining the second trust level based on the verification.

11. The computer-implemented method of claim 10, comprising determining the action based on the verification, the action comprising signaling the first operating environment of the device through the network to reset.

12. The computer-implemented method of claim 10, comprising:

assigning the second trust level to the secure operating environment;

determining the first trust level of the less secure operating environment; and assigning the first trust level to the less secure operating environment.

13. The computer-implemented method of claim 8, comprising employing a plurality of trust levels assigned to a plurality of devices in the network as factors in the analysis of the indication, the plurality of trust levels comprising the first and second trust levels and the plurality of devices comprising the device.

14. At least one non-transitory machine-readable storage medium comprising instructions that when executed by a processor component, cause the processor component to:

associate a first trust level, of a plurality of trust levels, assigned to a first operating environment of a device in a network with an indication of a malware attack received via the network from the first operating environment of the device, the indication to indicate an activity of a routine executed in the first operating environment and the indication to indicate a change to a hash of a portion of the routine of the device, the plurality of trust levels assigned to a plurality of devices in the network;

employ each of the plurality of trust levels as a factor in an analysis of a plurality of indications including the indication;

determine an action to take through the network to eradicate the malware attack based on the analysis; and take the action to eradicate the malware attack based on the analysis, the action to include a request of information from a second operating environment of the device assigned a second trust level of the plurality of trust levels, the information collected by the second operating environment via monitoring the activity of the routine executed in the first operating environment.

15. The at least one non-transitory machine-readable storage medium of claim 14, the processor component caused to:

receive a credential from the device via the network;

verify an ability of the device to provide a secure operating environment in addition to a less secure operating environment based on a verification of the credential, the first operating environment comprising the less secure operating environment and the second operating environment comprising the secure operating environment; and determine the second trust level based on the verification.

16. The at least non-transitory one machine-readable storage medium of claim 15, the processor component caused to determine the action based on the verification, the action comprising signaling the first operating environment of the device through the network to reset.

17. The at least one non-transitory machine-readable storage medium of claim 15, the processor component caused to:

assign the second trust level to the secure operating environment;

determine the first trust level of the less secure operating environment; and assign the first trust level to the less secure operating environment.

* * * * *

UNITED STATES PATENT AND TRADEMARK OFFICE
CERTIFICATE OF CORRECTION

PATENT NO. : 10,469,524 B2
APPLICATION NO. : 14/369587
DATED : November 5, 2019
INVENTOR(S) : Omer Ben-Shalom et al.

Page 1 of 1

It is certified that error appears in the above-identified patent and that said Letters Patent is hereby corrected as shown below:

In the Claims

Column 32, Line 32, replace "apparatus of claim 3, eradication component" with -- apparatus of claim 3, the eradication component --.

Signed and Sealed this
Eighteenth Day of February, 2020

Andrei Iancu
*Director of the United States Patent and Trademark Office*